United States Patent [19]

Ryan et al.

[11] Patent Number: 5,581,307
[45] Date of Patent: Dec. 3, 1996

[54] METHOD AND APPARATUS FOR SCRAMBLING AND DESCRAMBLING OF VIDEO SIGNALS WITH EDGE FILL

[76] Inventors: John O. Ryan, 22015 Creekside Ct., Cupertino, Calif. 95014; James R. Holzgrafe, 2710 Thomas Grade Rd., Morgan Hill, Calif. 95037

[21] Appl. No.: 401,016

[22] Filed: Mar. 8, 1995

Related U.S. Application Data

[62] Division of Ser. No. 202,349, Feb. 28, 1994, Pat. No. 5,438,620, which is a continuation of Ser. No. 795,890, Nov. 19, 1991, abandoned.

[51] Int. Cl.$^6$ ............................... H04N 9/66; H04N 9/78
[52] U.S. Cl. ........................ 348/630; 348/638; 348/666; 348/668
[58] Field of Search ...................... 348/625, 627, 348/638, 641, 642, 659, 663, 666, 668, 630; H04N 9/66, 9/78

[56] References Cited

U.S. PATENT DOCUMENTS

| | | | |
|---|---|---|---|
| 5,103,296 | 4/1992 | Teichner | 348/668 |
| 5,374,964 | 12/1994 | Rzeszewski | 348/625 |

FOREIGN PATENT DOCUMENTS

| | | | |
|---|---|---|---|
| 63-69395 | 3/1988 | Japan | H04N 9/66 |
| 63-69394 | 3/1988 | Japan | H04N 9/66 |

*Primary Examiner*—Safet Metjahic
*Assistant Examiner*—Jeffrey S. Murrell
*Attorney, Agent, or Firm*—Gerow D. Brill

[57] ABSTRACT

A video-scrambling system induces a random wobble i.e., time shifting, in the location of active portion of the video frame, without affecting the horizontal sync signal and colorburst in each video line, thus providing both security and concealment. The security is enhanced by filling in the gap between the nominal beginning of active video and the actual beginning of active video with a synthesized video signal which replicates the adjacent active video using a digitally generated filling pattern. Also, a random noise overlay further conceals the location of the gap. Additional concealment is provided by wiggling in time the location of the horizontal sync signal using one or two frequencies and also by randomly altering the location of the vertical sync signal. The NTSC digital encoding in accordance with the invention is simplified by using only two channels, chrominance and luminance, and by a heterodyne circuit for chrominance stability. NTSC encoding is enhanced by providing detail normally lost, by use of the chroma channel. Additionally, a non-standard video signal may be provided with a portion of the colorburst on the front porch of the horizontal blanking, thus allowing use of a relatively simple decoder.

4 Claims, 18 Drawing Sheets

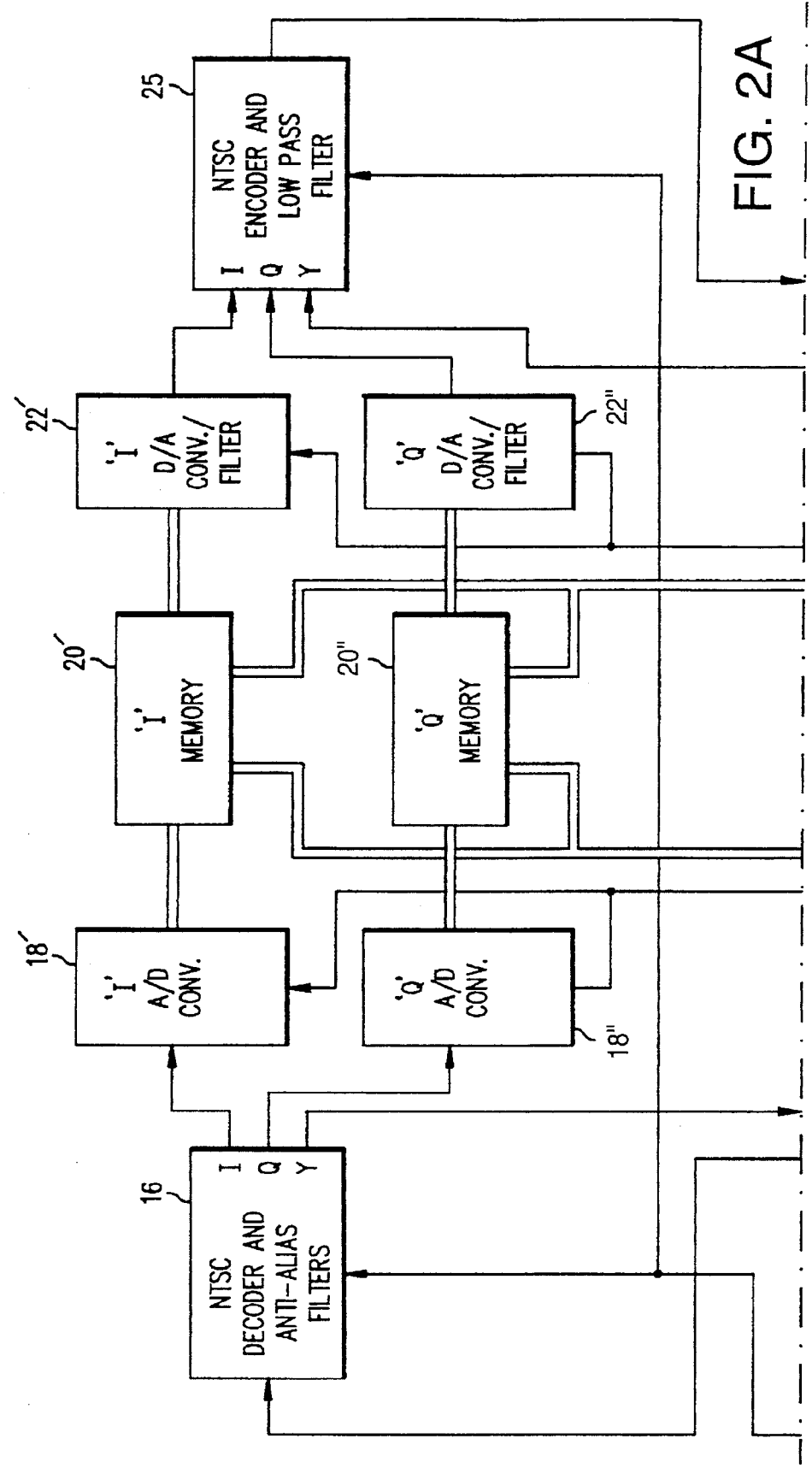

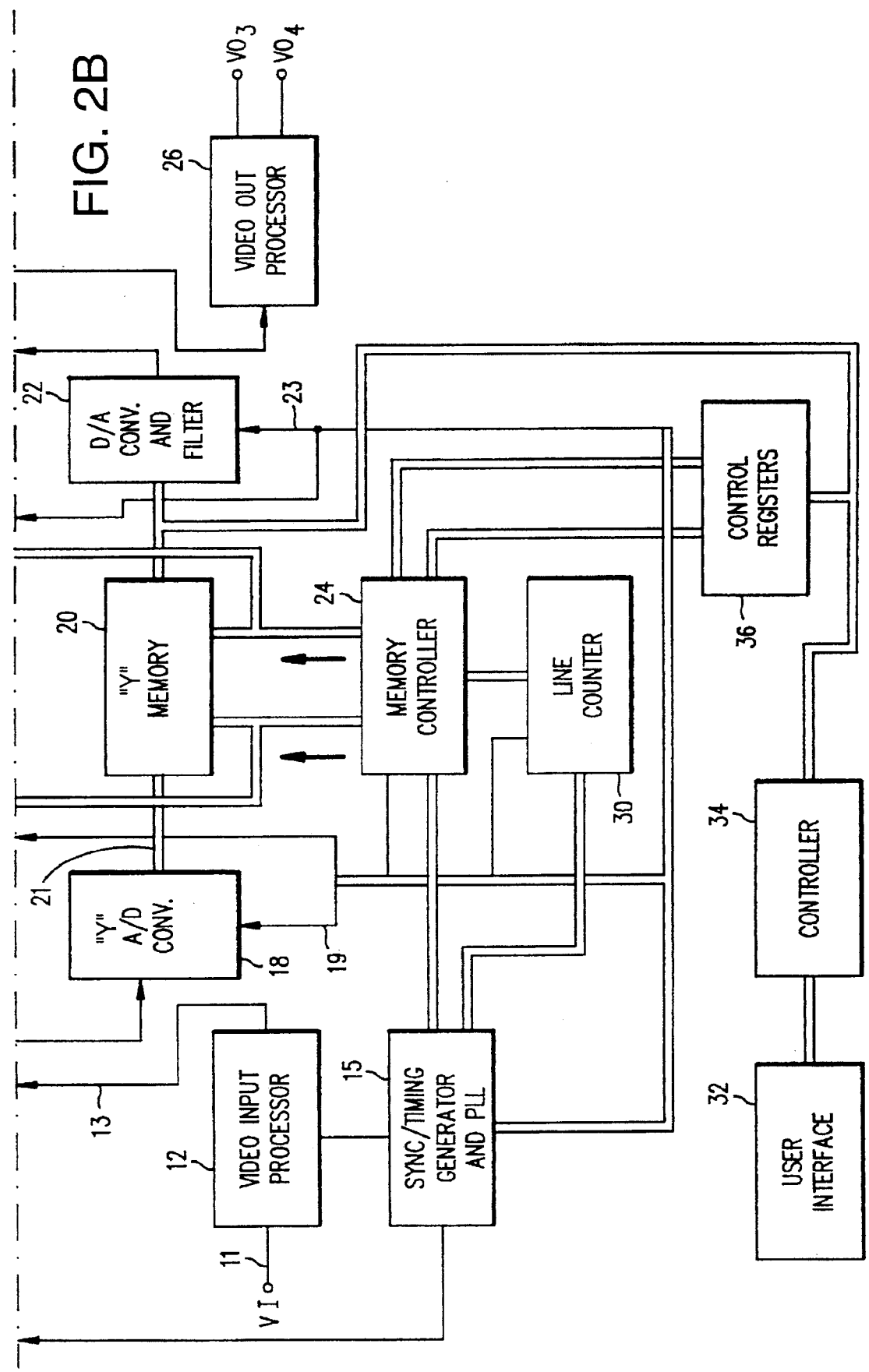

INPUT PROGRAM CHROMA 3.58 MHz

C' JITTERED CHROMA FROM SCRAMBLING 3.58 MHz ± ΔF 3.58 MHz ± ΔF
(MASTER CLOCK) ÷ 4

14.32 MHz.
MASTER CLOCK

BPFA    BPFB

5/2 X 3.58 MHz ± ΔF    7/2 X 3.58 MHz ± ΔF

LPF

BPFB    BPFA 3.58 MHz = (7/2 X 3.58 MHz. ± ΔF) - (5/2 X 3.58 MHz ± ΔF)

= (2/2 X 3.58 MHz ± ΔF - (± ΔF)

= 3.58 MHz

METHOD AND APPARATUS FOR SCRAMBLING AND DESCRAMBLING OF VIDEO SIGNALS WITH EDGE FILL

This application is a division of application Ser. No. 08/202,349, filed Feb. 28, 1994 now U.S. Pat. No. 5,438,620 issued Aug. 1, 1995 which is a continuation of Ser. No. 07/795,890 filed Nov. 19, 1991, now abandoned.

BACKGROUND OF THE INVENTION

1. Field of the Invention

This invention relates to signal processing of time domain electronic signals, such as video information signals. In particular, the invention relates to improvements in scrambling and descrambling such signals to prevent unauthorized use thereof, including several improvements in security and concealment.

2. Description of Related Art

Commonly assigned U.S. Pat. No. 5,058,157 issued Oct. 15, 1991 to John O. Ryan (incorporated herein by reference) discloses a method and apparatus for encrypting (scrambling) and decrypting (descrambling) information signals normally arranged as a succession of lines of active information, with each line having a line timing reference, such as color video (television) signals. The active video portion of each line is time shifted with respect to the horizontal sync portion of that line using a predetermined slowly varying time-shifting function. The time-shifting information is conveyed to the decryption site by encoding the instantaneous value of the time-shifting waveform for the beginning of each field in the vertical blanking portion of that field. To provide a reasonable maximum time-shifting range, portions of the trailing edge of the active video in the preceding line and portions of the leading edge of the active video in the current line are discarded. During decryption, the original line timing and colorburst signals are discarded and new signals are generated which are time displaced from the active video portion by the original amount before encryption. This provides a secure video type information encryption and description technique compatible with all video tape formats and transmission systems, and which is free of picture impairments caused by the interaction of the scrambling algorithm and the chrominance consecutive line averaging systems used in color-heterodyne recording.

The type of time shifting performed may comprise any one of a number of slowly varying functions, such as a sinusoidal waveform or a linearly changing ramp signal. The rate of change in the signal, i.e. the "wobble", is relatively slow when compared to the line rate of the input signals to be processed. For video type signals, a sinusoidal waveform having a frequency of no more than about 20 Hz is used. The absolute amount of time shifting performed is preferably limited to a maximum value which, in the case of NTSC video signals, does not exceed a total of 4 microseconds (plus or minus 2 microseconds in each direction).

The instantaneous value of the time shifting waveform function at the beginning of each field is conveyed along with the field information, typically during the vertical blanking interval. For example, with respect to a sinusoidal time shifting function, the starting amplitude of the waveform during a given field is transmitted during the vertical blanking interval as a single byte of information which, when combined with a separately provided authorization key, enables a descrambling circuit to synthesize the scrambling waveform function. Decryption is the inverse of the encryption process and is performed by restoring the original timing relationship between the horizontal sync (and colorburst) and the active video portion of the corresponding line. This is done by generating new line timing reference signals (horizontal sync and colorburst) which bear the same timing relationship to the active video portion as do the original line timing reference signals before encryption. The resulting descrambled signals still contain time base errors but these errors are within the capture or correction range of the follow-on television monitor/receiver.

FIGS. 1A and 1B herein correspond to FIGS. 3A and 3B of the above cited U.S. Pat. No. 5,058,157, and illustrate the manner in which the scrambled signals are descrambled at the reception site, i.e. the descrambler. With reference to FIG. 1A, three successive lines of NTSC video are shown which have been time shifted successively by increasing amounts. (The active video portions of each of the lines in FIGS. 1A and 1B are only fractionally illustrated.) The topmost line represents a line N having no time shifting between the active video portion and the end of horizontal blanking, and the time between the beginning of a horizontal sync portion and the active portion is designated as $t_1$. The next line N+1 has undergone time shifting in the delay direction so that the time between the beginning of the horizontal sync portion and the beginning of active video portion is $t_2$, greater than $t_1$. Line N+2 has undergone even more time shifting in the delay direction by an amount labeled $t_3$ which is greater than $t_2$. These three successive lines represent lines from the upper portion of a raster image. The line timing reference part of each of lines N, N+1 and N+2 are all temporally aligned in FIG. 1A; the leading edge of the horizontal sync portion of each line is exactly aligned with the leading edge of the horizontal sync portion of the other lines. The same is true of the location of the colorburst portions (hatched areas). The active video portions, however, are deliberately misaligned in lines N+1 and N+2 with respect to line N.

FIG. 1B illustrates the signals for the same three lines after descrambling, i.e. decryption. As can be seen in this figure, the leading edges of the horizontal sync portions of the three lines are no longer precisely aligned, but are rather staggered; however, the distance between the leading edge of the horizontal sync portion and the beginning of active video is the same for all three lines, i.e. the value $t_1$. Similarly, the colorburst portions (hatched areas) of the three lines are no longer temporally aligned, but are rather staggered in the same fashion as the horizontal sync portions. Relative positioning of the active video portion of the three lines remains the same.

Although the descrambled signals are still relatively misaligned, the precise timing relationship $t_1$ between the leading edge of horizontal sync and the beginning of active video ensures that each line of information, as processed by the follow-on television receiver or monitor, can be properly displayed, provided that the timing error in a given line does not exceed the capture range of the television receiver or monitor synchronization circuitry. The time shifting applied to the original signals during encryption is relatively slowly varying (20 Hz for NTSC TV) compared to the video line rate.

FIGS. 2A and 2B herein are the same as FIGS. 4A and 4B of U.S. Pat. No. 5,058,157. These figures show in block diagram form a scrambler system capable of providing the above-described scrambling. As seen in FIGS. 2A and 2B, input video to be scrambled is coupled to an input terminal 11 of a video input processor unit 12. Processor 12 functions to normalize the incoming video signal relative to gain, DC offset and bandwidth and provides a stable low impedance buffer unit for the video appearing on output terminal 13. In addition, the incoming vertical and horizontal sync portions are separated from the input video by processor unit 12 and supplied as input to a sync/timing generator and phase locked loop 15.

The signals from processor unit 12 appearing on output terminal 13 are coupled to a conventional NTSC decoder and anti-alias filter 16 in which the luminance component Y and chrominance quadrature components I,Q are separated for three channel parallel processing in the digital domain. The Y output of unit 16 is coupled to an analog-to-digital converter 18 in which the luminance is converted from analog to digital form at a preselected clock rate by means of an input sample clock signal supplied on clock input line 19. The input of converter 18 is coupled to an input portion of a dual-ported luminance memory unit 20. This is then the Y channel memory connected to the Y channel D/A converter 22. Memory unit 20 is configured as a memory in which a word is written from A/D converter 18 into every memory cycle and a word is read from memory unit 20 to a digital-to-analog converter unit 22 every memory cycle.

Read/write control signals and multi-bit address signals are supplied to the luminance memory unit 20 from a memory controller unit 24. The output of luminance channel memory unit 20 is coupled to the input of a digital-to-analog converter 22, in which the multi-bit digital words output from memory 20 are converted into analog samples at the clock rate by clock signals supplied from unit 15 on clock input line 23. The output of converter unit 22 is coupled to the input of an NTSC encoder and low pass filter unit 25 in which the luminance signal is combined with the I and Q chrominance components and renormalized with respect to band-width and DC offset. The I, Q chrominance quadrature components are processed in an essentially identical manner to that described above for the luminance component Y in respectively units 18', 20' and 22' and 18", 20", and 22", which function in the same manner respectively as do units 18, 20 and 22.

Sync timing unit 15 generates the input clock signals used to provide the sample clock for A/D converter unit 18, the read and write clock signals from memory unit 20, and the clock signals for D/A converter unit 22. Preferably, unit 15 is comprised of a discrete phase detector, a number of sampling gates, and error amplifier and a crystal clock oscillator.

The above described units are coupled to a user interface device 32, such as a keyboard terminal, via controller unit 34 and a plurality of control registers 36.

The above described device and the associated scrambling method have several shortcomings.

First, the device is relatively expensive and complicated in that there are three sets of A/D converters and associated memories, one for each of the Y, I, and Q components. Thus, there are three independent channels for digital processing, each channel requiring relatively expensive components, thus increasing the cost and complexity of the scrambling device.

Secondly, the method of scrambling as depicted in FIGS. 1A and 1B while reasonably secure has the potential defect that in the process of moving the active portion of the video to the right as shown in the drawings, the leading and trailing edges of the horizontal sync signal have both been moved to the right also. This displacement of the normally well known position of horizontal sync within the horizontal blanking interval could be detected by a clever pirate, i.e. unauthorized user, to determine the amount of wobble (time displacement) in each line. The pirate would be able at least in theory to descramble the signal to determine what the amount of wobble and reverse the process, thus obtaining a descrambled and viewable signal. Thus, the method as depicted in FIGS. 1A and 1B is lacking in the very high degree of security desirable for a commercial scrambling system.

Another shortcoming of the above-described scrambling system is that while providing security, i.e. generally preventing unauthorized use, the scrambled signal when viewed on a normal television set is not completely concealed. That is, a determined viewer who is willing to watch a television picture which is in effect horizontally jumping back and forth can still watch the program and understand at least partly what is going on. This is undesirable for transmission for instance of adult type material where it is desired to prevent children from watching even the scrambled picture. This is especially problematic because it has been determined by experimentation that such adult type material, i.e. depictions of sexual activity, is particularly easy to follow on the picture by a viewer even though the picture is scrambled. This is another way of saying that the scrambling while relatively secure does not provide an adequate level of concealment for all program material.

Another problem associated with the above described device is one common to comb-type NTSC decoders in which the composite video is subjected to a one-line delay. Simple addition of the delayed video to the same video before the delay causes the chrominance portion of the two signals to cancel, leaving only luminance. Similarly and simultaneously, subtraction of the delayed signal from the undelayed signal (or vice versa) causes the luminance portion to cancel, leaving only chrominance. This problem is not specific to a scrambling device but is typically encountered in video processors which perform NTSC decoding and is the reduction of vertical detail, resulting in smeared vertical edges in the picture. This is due to the two-line summation process of the Y, I and Q components in which fine grain picture detail tends to be lost when the composite video is converted to digital and then in the digital domain a luminance/chrominance separation is performed. It is known that this problem can be overcome by complicated and expensive circuitry which takes the incoming composite video signal in the analog domain, using a band pass or high pass filter to isolate the chrominance component before separation. The band pass filtered signal is then delayed and subjected to the subtraction process. The band pass filtering removes the vertical luminance edges because they are low frequency in nature. Thus the chrominance separation is performed only on the high frequencies and having done this, the resultant separated chrominance has no luminance component. Finally the luminance signal is isolated by subtracting the finished, high frequency chrominance signal from the incoming composite video so there is no loss of vertical detail. This process is effective but when done digitally requires two A/D conversions: one for the band passed (or high passed) chrominance and one for the broad band composite video. It would be desirable to eliminate or simplify this process in order to reduce the number of components needed and reduce the amount of processing on the signal.

Thus, the method and apparatus disclosed in the above cited patent while adequate is still subject to significant improvement in both security, concealment, and complexity.

It is to be understood that the above cited patent is commonly assigned with the present invention and that the above description is not an admission that the subject matter disclosed and claimed in the above cited patent is necessarily prior art with respect to the subject matter of the present disclosure and claims.

SUMMARY OF THE INVENTION

A scrambler and descrambler are provided in accordance with the invention to overcome the above described shortcomings of the method and apparatus disclosed in the above cited patent and also to provide improved security and concealment and greater flexibility i.e. additional applications.

In accordance with the invention, first the problem of the easily detected edge of horizontal blanking in the scrambled signal is overcome by filling in the gap between the position where active video would nominally start or end and where it actually starts and ends due to the scrambling process of FIG. 1A. This gap is filled with signals which are undetectable compared to the expected active video, preventing the pirate from building a device which would be able to track electronically the transition at the gap. This "edge fill" process recognizes that for four adjacent (successive) pixels, the luminance will generally be relatively static and the chrominance will describe one complete cycle in these four pixels. Thus if at the edge of the active portion of the video, i.e. the edge of the picture, four adjacent pixels are repeated in sequence, this provides a continuous unbroken chrominance sine wave with exactly the phase and amplitude of those four sampled pixels and a luminance signal which mimics that of the four pixels. This in effect generates a continuous signal which matches the single set of four pixels for as long as is desired, i.e. the sequence of four pixels may be repeated as long as desired to fill the gap. A number of pixels other than four may also be used.

In accordance with the invention this edge fill is provided in the digital domain by stopping the normal incrementation of the address counters for the eight most significant of the ten bits which define the location of each pixel. While the two least significant bits continue to run, i.e. to increment normally. Thus the eight "frozen" most significant bits define a set of four pixels, and the two running least significant bits cycle through those four. Thus at the right edge of the picture where the active video has been moved to the left due to the scrambling process (see FIG. 1A) opening a gap at the right edge of active video, if the address performs its normal incrementation until the edge of the active video is reached, at that point the eight most significant bits in the pixel value are stopped and the two least significant bits are allowed to run. This generates a repetitive set of four pixels defined by the changing of the two least significant bits. This "pseudo-active" video is stretched as long as desired, defining the desired pseudo-active video fill at the edge of the picture, i.e. at the end of the active video portion of one line. Similarly, at the left edge of the picture, the eight MSB's are set to the address of the first four pixels of the active video and the two LSB's allowed to run. This "anticipates" the video content of the left edge of the picture in a manner identical to that described above; when the left-edge gap has been filled, the eight MSB's are released or "unfrozen" and the address increments normally.

In a refinement of this edge fill process, to prevent a clever pirate from detecting that at the edge fill each pixel would be identical, a low level and low frequency noise signal is added, i.e. a random noise overlay, so as to slightly disturb the steady state which is the repeated pixel data. This insertion of what amounts to edges, i.e. variation, in that portion of the active video would prevent the pirate from distinguishing the edge fill from the active picture by observing where there is no change. This random noise is provided on luminance and also both portions of the chrominance (for Y, I and Q). Otherwise, an extremely clever pirate could decode all three signals and look for a steady state on any one of them. This random noise is provided in either the digital or analog domain in various embodiments of the invention.

Also in accordance with the invention, the problem of the relative complexity of the three channel NTSC digital decoder as described above and shown in FIGS. 2A and 2B is overcome by a simplification which only separates luminance from chrominance, thus using only two channels instead of three; thus Y, I and Q instead become only luminance which is Y and chrominance designated C. Luminance is then caused to "wobble" (time shift) in terms of the location of the beginning of active video in each line directly, with the separated chrominance portion identically wobbling and then processed by a heterodyne circuit which frequency stabilizes the chrominance. Thus the processing is done in only two channels—luminance and chrominance, which saves substantially on the amount of expensive circuit elements provided and improves the tracking of chrominance with respect to colorburst. Additionally, advantageously the reduction of the amount of encoding and decoding for NTSC signals reduces the generation of undesirable artifacts in the picture.

In accordance with another aspect of the invention, a sync "wiggle" is provided as a concealment overlay to the main timeshifting scrambling system. This means that there is a further modification of the video signal which obscures the picture when viewed prior to descrambling, thus preventing an unauthorized person from seeing anything recognizable on the picture if he attempts to view the picture without having descrambled it. This concealment overlay involves in one embodiment time shifting in a pseudo random fashion the location of the horizontal sync signal in each line. In another embodiment, the sync signal location is wiggled in a more complex fashion by using two non-fixed, i.e. genuinely random patterns, hence moving the location of the sync signal in a more complex fashion.

In another version, the sync wiggle also includes a vertical sync wiggle, i.e. the locations of the vertical sync signals in the vertical blanking interval are wiggled in pseudo-random or other fashion in addition to the horizontal wiggle, thus adding a vertical rolling effect to the appearance of the scrambled picture when displayed on a television screen. The resulting patterns tend to roll through the picture vertically, obscuring the picture in two dimensions. In one embodiment the vertical wiggle is performed in a four field sequence in which in the first field the vertical sync is reinserted so as to be advanced, i.e. move forward in time. In the second field the vertical sync is removed. In the third field the vertical sync is reinserted so as to be moved far back, i.e. to the right in time as far as possible. In the fourth field in the sequence again the vertical sync signal is removed. This process confuses both newer type television sets which have line counters which attempt to track the moving vertical sync and hence will become confused developing a jump, and also, will confuse the older type television sets in which the absence of the sync pulse will cause uncontrollable rolling again completely obscuring the picture.

In accordance with another aspect of the invention, the above-described problem of loss of vertical detail in NTSC decoders is overcome by recovering the missing vertical detail from the pre-existing chrominance channel. This is performed by providing as described above the two separated signals chrominance ("chroma") and luminance ("luma"). The chroma signal also contains the "missing" luma vertical detail. The chroma channel data in the digital domain will in any case be converted to analog form. Then in all portions of the video picture outside the vertical blanking interval the chroma information is low pass filtered to remove the chrominance itself, leaving the missing vertical detail information, which is simply added back into the luma analog signal. This restores the missing vertical detail without any extra, expensive digital processing or extraneous A/D conversion steps.

In accordance with another aspect of the invention, the predetermined slowly varying time shifting function (the wobble) is provided by digitally generating a low frequency, randomly frequency modulated sine wave. This is done by operating a digital counter from a randomly-varying clock source, and applying the output of the counter as an address to a programmable read-only memory (PROM) which holds the sine wave function. Thus at each step the PROM outputs a digital word representing one point on the sine curve. This data is then applied to a digital analog converter providing an analog output signal. In accordance with the invention the above described sine wave would in most cases provide excessive amounts of information which it would not be possible to process. Thus in accordance with the invention instead the sine wave is sampled at the field rate, i.e. 60 Hz, and only the samples are transmitted. Then the decoder may reconstruct the same sine wave from the sampled data.

The predetermined slowly varying time shifting function, as described above, varies at about 20 Hz or less which is less than half the 60 Hz sample rate, thereby allowing perfect reconstruction of the original sine wave in accordance with well-known sampling theory requirements. Thus in accordance with the invention the digitally generated sine wave from the PROM is latched once per video field, i.e. at 60 Hz, into a latch which holds the digital word to suitable precision over the timed duration of the entire video field. Then once in each video field the data is read out from the latch and applied to a D/A converter, thereby generating an analog-domain version of the sampled sine wave. This wave form is smoothed by a conventional filter and applied to the circuitry which controls the position of the picture in the output video signal.

Simultaneously, the latched digital data is transmitted to the decoder, which then performs in the same order the similar function in extracting the digital word, latching this word and holding it over one video field and applying the data to a digital to analog converter, thus providing the output function which allows descrambling of the signal. The step approximation then is smoothed through an identical RC filter to that in the encoder, thereby restoring an analog type sine wave matching that in the encoder. The decoder has then merely to regenerate horizontal sync, horizontal blanking, and colorburst signals in accordance with the recovered/reconstructed sine wave and insert them into the received scrambled video wave form to complete the descrambling process.

In accordance with another aspect of the invention, for use with a dedicated video system (non network compatible) the time-shift wobbling of the active video portion of the line is allowed to result in a narrowed horizontal blanking interval. This allows maintenance of the full width of the active video and hence an improved picture at the picture edges. Although such a system would not be compatible with for instance broadcast or cable television, it would be suitable for use with dedicated system such as a video cinema application where transmission is not required, but where it is desired to retain the full width of the picture. Thus it is possible to reduce the duration of the horizontal blanking interval to provide space for the active portion of the video i.e. the picture to "wobble into" without having to lose any portion of the signal thereby. If the width of a horizontal blanking interval is thus reduced, there is still the necessity to transmit an adequate length colorburst portion of the signal. This is performed in accordance with the invention by locating a portion of the colorburst on the front porch of the horizontal blanking interval and the remainder of the colorburst conventionally on the rear porch of the horizontal blanking interval. In a variation, the colorburst can be started on the front porch and allowed to continue all the way through the sync pulse.

Also in accordance with the invention a video inversion picture concealment method is provided wherein on a line-by-line basis particular lines of the picture are inverted in random fashion, i.e. the light portions are dark and the dark portions are light. The pattern of which lines are inverted or not inverted changes in random fashion at a predetermined rate so as to offer the desired degree of concealment. Such video inversion is also relatively secure in the sense that it would be difficult for a pirate to determine in real time whether any particular line is inverted or not and hence it would be difficult to defeat this concealment technique.

Also provided in accordance with the invention is a vertical wobble in the active video in the sense of time displacement of the location of the vertical blanking interval in a slowly varying fashion in succession video fields, analogously to the previously described horizontal wobble.

BRIEF DESCRIPTION OF THE FIGURES

FIGS. 2A and 2B show a block diagram of a scrambler unit as disclosed in U.S. Pat. No. 5,058,157.

DETAILED DESCRIPTION OF THE INVENTION SCRAMBLER OPERATION

Throughout the description following, specified parameters ("eight-bit", "ten-bit", "0–909 counters" etc.) refer to the preferred embodiment of the invention in the particular case of a 4-times subcarrier frequency sampled NTSC-standard unit. The principles described herein are generally applicable to other standards (such as PAL), and other sampling rates by applying detail modifications in accordance with principles well known to those versed in the art.

Figure 3:
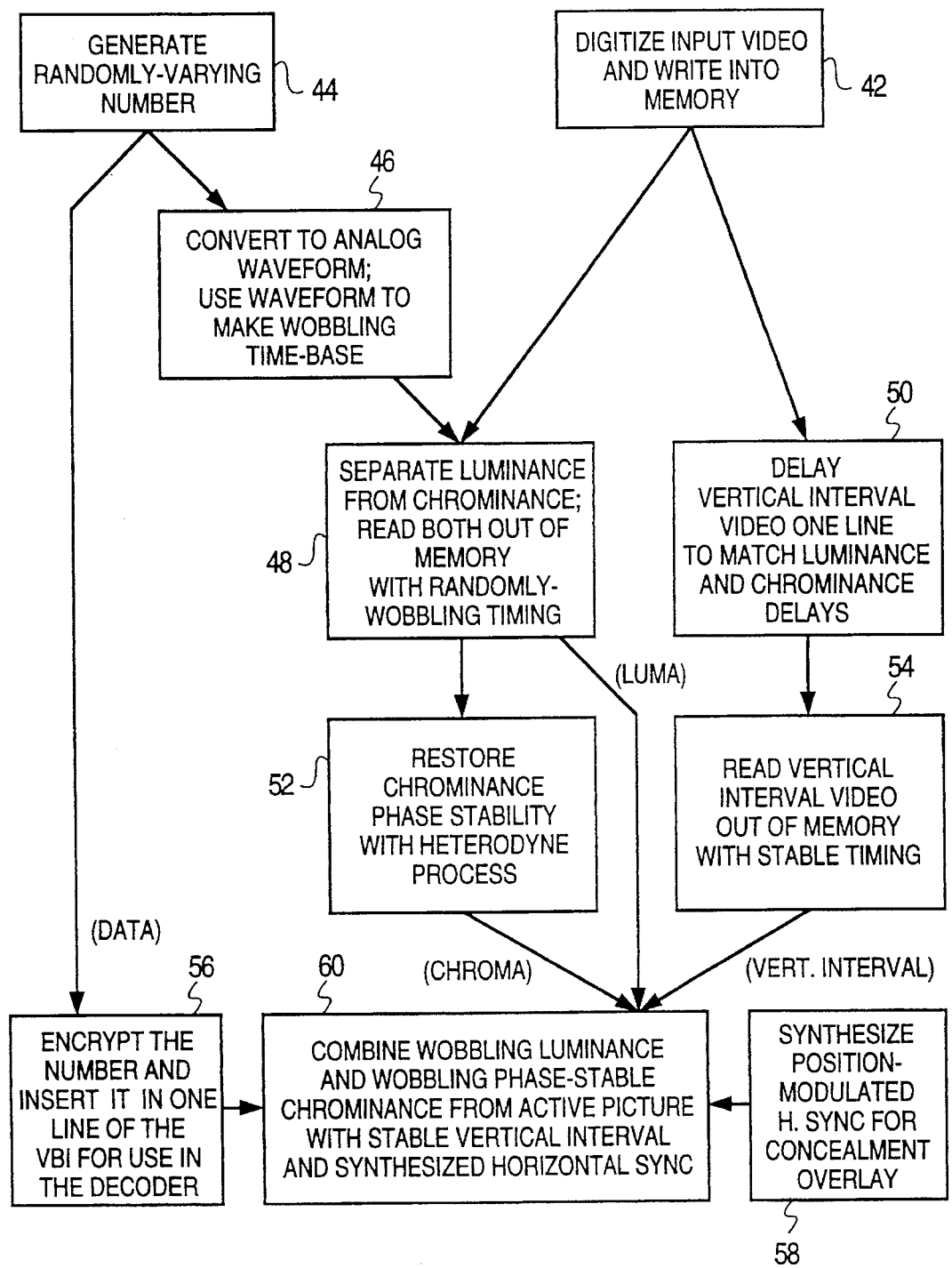
FIG. 3 shows a flowchart of the scrambling process in accordance with the present invention.

FIG. 3 is a flowchart showing scrambling in accordance with the invention as performed in the scrambling device. Beginning at step 42, the incoming analog video signal is digitized and written into a conventional random access memory. In parallel, the conventional random-number generator generates a randomly varying number in step 44. Then the randomly generated number is converted to an analog waveform and the waveform is used to make the wobbling time base for purposes of video encryption in step 46.

Step 46 generates an analog waveform in conjunction with the randomly frequency modulated sine wave which is used to generate a wobbling time base. In an alternative embodiment, the wobbling time base can be generated digitally, identically to the process described for the digital descrambler (FIG. 16A). The 1:1880 counter 588 referenced there provides precisely the desired address bus. In step 48, for the digitized video previously written into memory, the luminance Y is separated from the chrominance C by an addition and subtraction process and both of the signals Y, C are read out of memory with the same randomly wobbling timing. This provides both luminance and chrominance which are wobbling. Since there is intrinsically a one line delay in this separation process of step 48, the vertical blanking interval video, which is not scrambled but needs to match time-wise with luminance and chrominance, is delayed by one line in step 50 so as to maintain its time alignment with the luminance and chrominance portion of the signals.

This provides three signals: luminance, chrominance and vertical interval. The luminance signal is wobbling, the chrominance signal is wobbling, and the vertical interval signal is stable in terms of time. There is need then to restore the phase stability of the chroma signal, as is done in the heterodyne process of step 52. Then the composite video signal is reconstructed in step 60 by putting the chroma back on the luma, reblanking, then generating sync. Thus the wobbling luma and the phase stable, heterodyned wobbling chroma are combined and in the vertical interval the output signal is switched over to the stable vertical interval output signal from step 54. In the horizontal interval there is a need to synthesize a sync pulse which wiggles for purposes of concealment. This is done in step 58 where there is synthesis of a position modulated horizontal sync for concealment overlay. This synthesized sync is then added into the composite video signal in step 60.

There is also a need to transmit the information needed for descrambling to the decoder device (not shown). Thus the randomly varying number from step 44 is latched into one line of the vertical blanking interval in step 56. This data is formally encrypted by conventional means in order to prevent a pirate (unauthorized person) from extracting the randomly varying number.

Figure 4:
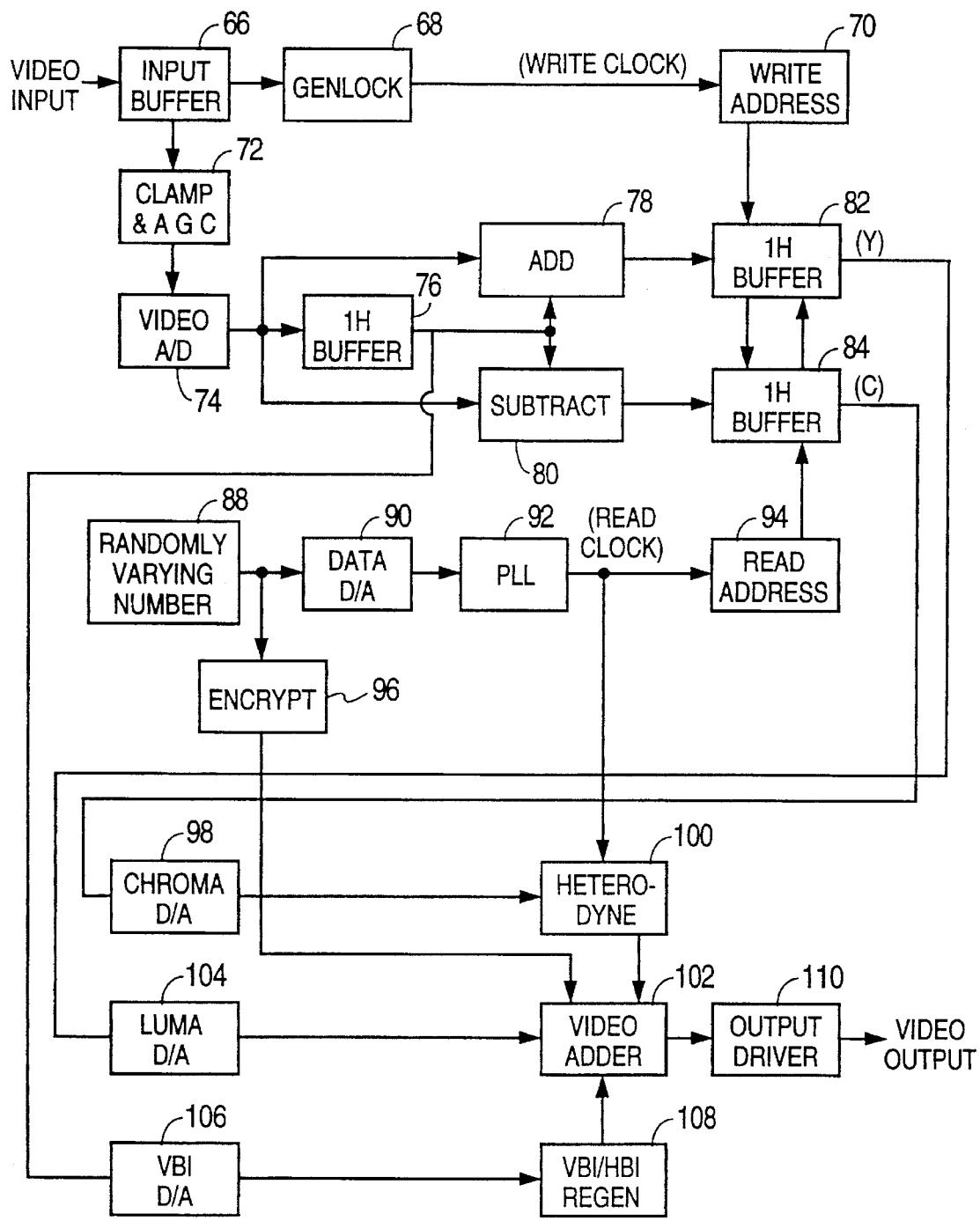
FIG. 4 shows a block diagram of a scrambling device in accordance with the present invention.

FIG. 4 shows a block diagram of a scrambler for the process of FIG. 3. Beginning in the upper left hand portion of FIG. 4 the conventional input video signal is input to frame input buffer 66. The conventional clamping and AGC (automatic gain control) processes are performed in block 72. Conventional genlock is performed on the input video signal in block 68 by operating a crystal oscillator at four times the subcarrier frequency which is phase-locked to the incoming colorburst signal. The output of the genlock circuitry 68 is then the write clock signal. The incoming video signal is applied to a video analog-to-digital converter 74, outputting from A/D converter 74 a digitized video signal.

This digitized video signal is then applied to a digital system which includes a one horizontal line buffer 76 providing a one video line delay. Both the input and output of the buffer 76 are provided to adder block 78 and summed therein digitally. The output of adder block 78 is the Y (luminance) signal. Similarly the input and output of buffer 76 are subtracted in subtractor block 80, the output of which is the C (chrominance) signal. Thus the input video signal is separated into a two channel signal i.e., chrominance and luminance. The outputs of adder 78 and subtractor 80 are still stable in terms of time. The output of adder 78 is provided to buffer 82 which is also one video line in length. The output of subtractor 80 (which is the chrominance signal) is provided to buffer 84 which is also one video line long.

Each of buffers 76, 82, and 84 are so-called "ping-pong RAM's" i.e., dual banked random access memories providing double buffering. Thus each of these buffers includes two random access memory banks, one of which is written into and on the next video line the second one is written into while the first one is being read out from. In alternate embodiments, any suitable "real-time" FIFO-type memory or shift register may be used.

Write address block 70 receives the write clock signal from genlock circuitry 68. Thus the write address block is locked in time to the input write clock signal, and thereby to the input video signal. That write clock signal is four times the subcarrier frequency and is stable so that the luminance and chrominance are written in a stable synchronous fashion to the buffers 82 and 84 respectively.

In order to write to the buffers 82 and 84 three steps are taken. First, it is necessary to apply the signal data which it is desired to write. Secondly, one must supply addresses of the location in the buffers to which the data is to be written to. Third, it is necessary to tell the buffers when the writing is to take place. Thus the write address block 70 also provides the write timing. There is a 10 bit wide address bus from write address block 70 and also a clock line connecting block 70 to each buffer 82 and 84. The write address system i.e., both the address bus and the clock, are stable with respect to the input video signal. The read address (which is provided from read address circuitry 94) and its corresponding clock signal are wobbling in time as described below.

Thus when the contents of the luminance buffer 82 and the chrominance buffer 84 are output with the wobbling address signal from write address block 70, the resultant is a wobbling video signal. At this point luminance and chrominance from respectively buffers 82 and 84 are wobbling time-wise in the digital domain. These two signals are fed respectively to luma digital to analog (D/A) converter 104 and chroma digital to analog (D/A) converter 98 along with the matching clock signals and the address bus data. Thus the output of chroma D/A converter 98 and luma D/A converter 104 are analog signals.

The chroma signal output by chroma D/A converter 98 is heterodyned to achieve phase stability; this function is performed in the heterodyne block 100 as explained in detail below.

Now referring to the center left hand portion of FIG. 4, a randomly varying number is generated by random number generator 88 which outputs a frequency modulated sine wave in the digital domain. This is latched once per video field and provided to data digital to analog (D/A) converter 90 thus providing a stepped approximation of the sine wave. This stepped approximation of the sine wave is smoothed and drives a phase lock loop (PLL) 92 so that the frequency provided out of phase lock loop 92 is tracking the sine wave, i.e., tracking the phase of the phase lock loop, thereby generating a read clock signal which includes the wobble in terms of time. This read clock signal is then applied to a counter in read address block 94. This read address block 94 outputs a running address bus which is applied to buffers 82 and 84 as described above. Read address block 94 is essentially a counter. Thus the read address signal from block 94 is wobbling in time, unlike the write address signal from block 70 which is stable in time. The output of both write address block 70 and read address block 94 are on 10 bit wide buses and the output signals of these two counters 70 and 94 are ramping i.e., counting up.

Thus data is written simultaneously to both buffer 82 and buffer 84 and both buffer 82 and buffer 84 are read simultaneously. The write address bus signals provided from write address block 70 are on a 10 bit wide bus and the data i.e., the addresses, are counting up from 0 to 909 which is the digital length conventionally assigned to one video line, in an NTS system with a $4F_{SC}$ sampling rate. Similarly, the read address from read address counter 94 is counting from 0 to 909, but the timing thereof varies with respect to the write address by the amount of the wobble which typically varies from +2 to −2 microseconds. Thus another way of describing the wobble is that if one looks at the instant in which the write address has a value $0F_h$, the read address at that same time would have a different value and might not reach $0F_h$ until 2 microseconds later or perhaps 2 microseconds earlier.

Thus the chroma analog signal from block 98 and the luma analog signal from block 104 are wobbling in time when read respectively in digital form from buffers 84 and 82. As described above, the chroma signal from block 98 must be heterodyned to maintain its relative phase. That is, it is desired to maintain stability of the relative phase with respect to colorburst of the chroma signal, but still to allow the amplitude and phase modulation envelopes to wobble. This is done as described in further detail below by using the read clock signal from phase lock loop 92 which also includes a wobble which is identical to that in the chroma signal, and applying the read clock signal to a double balanced modulator circuit in heterodyne circuit 100. Then if the difference is taken between the two signals, the wobble on the read clock signal is subtracted from the wobble on the chroma signal, resulting in a phase-stable chroma signal with its envelope wobble unaffected.

Also, the digitized video output from buffer 76 is also delayed one line as applied to vertical blanking interval D/A converter 106. The vertical blanking interval data is not wobbling but is stable. Thus the vertical and horizontal blanking interval signals are regenerated in vertical blanking interval and horizontal blanking interval regenerator 108.

Then all three signals from blocks 100, 104, and 108 are combined together in video adder 102 to reform composite video with the vertical interval data inserted during the proper time. Also inserted is the encryption data from encrypt data block 96, which is typically inserted in the region of line 20 of the vertical blanking interval. Then the output of the video adder 102 is provided to output driver 110 (which is a conventional amplifier) providing output analog video signal as shown.

The various blocks shown in FIG. 4 in the preferred embodiment of the invention in the scrambling device are embodied in circuitry conventionally located on various printed circuit boards which include integrated circuits and discrete components. In the preferred embodiment the scrambling device includes four such printed circuit boards, the first of which is the input board which includes input buffer 66, genlock circuitry 68, clamping AGC circuitry 72, and video A/D converter 74. The second board is the RAM (random access memory) board which includes buffer 76, adder 78, subtractor 80, buffer 82, and buffer 84. The third board is the control board which includes write address circuitry 70, randomly varying number generator 88, data D/A 90, phase lock loop 92, read address circuitry 94, and encrypt circuitry 96. The fourth board is the output board which includes chroma D/A 98, heterodyne circuitry 100, video adder 102, luma D/A 104 VBI D/A 100, VBI/HBI regeneration 108, and output driver 110. Each of these boards is discussed below in further detail.

Figure 5:
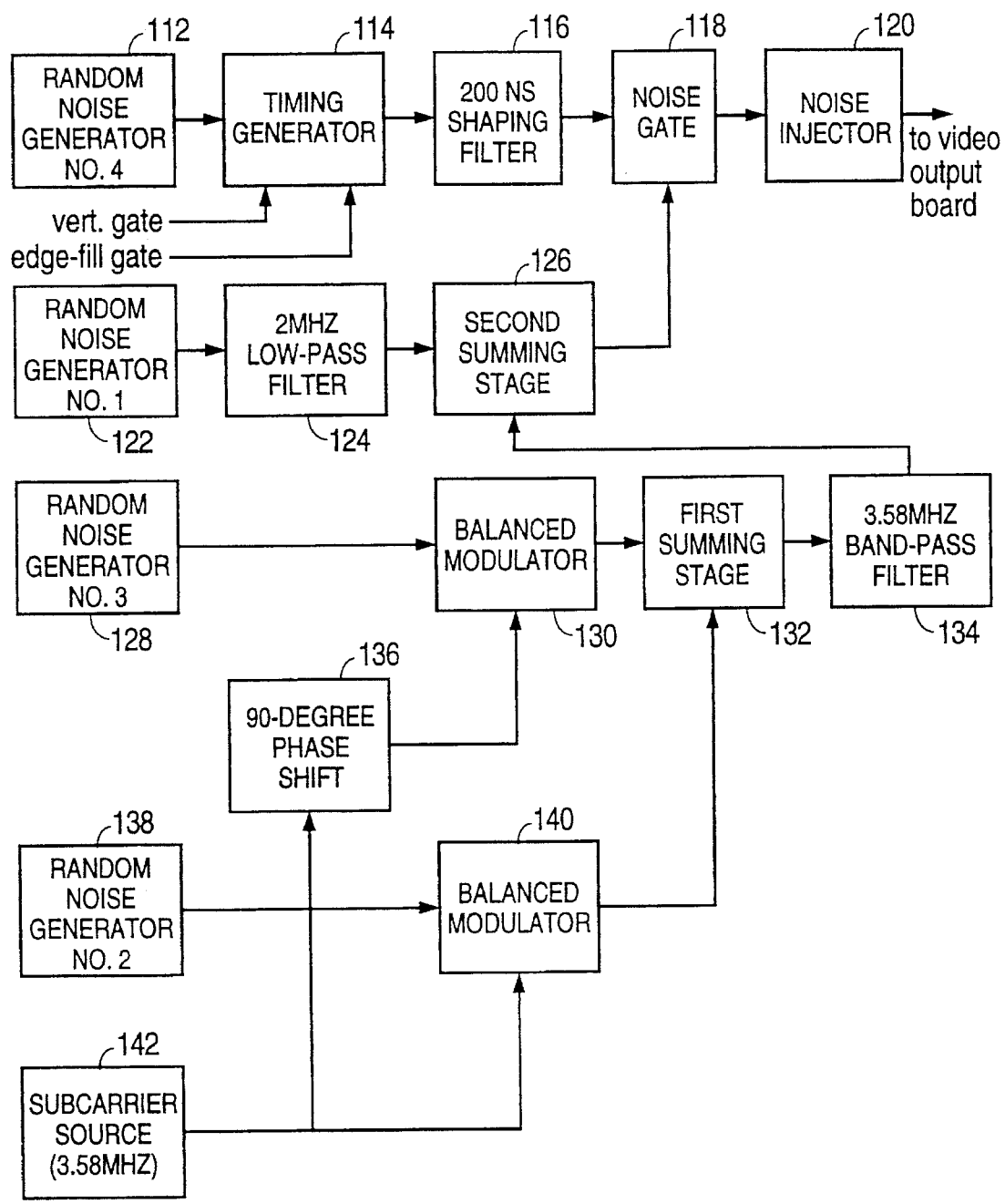
FIG. 5 shows a block diagram of random noise overlay circuitry in accordance with the present invention.

FIG. 5 shows the random noise overlay generation circuitry as discussed above which provides the added concealment to the edge fill. There are four different parameters in the edge-fill region that must be randomized for full security: (1) the luminance ("Y"), (2) the in-phase chrominance component ("I"), (3) the quadrature chrominance component ("Q"), and (4) the envelope or timing of the inserted noise ensemble. It should be pointed out that any or all of these may be omitted for a simpler but less secure implementation. Alternatively, the entire system may be implemented as shown but using fewer than four independent noise generators (that is, sharing noise sources), again with reduced effectiveness.

As shown in FIG. 5, random noise generator #1 22, and the 2 MHz LPF 124 generate random luminance. Random noise generator #2 138 and its associated balanced modulator 140 generate a random "I" chroma components; random noise generator #3 128, the 90-degree phase shifter 136 and the related balanced modulator 140 generate a random "Q" 136 chroma component; the two are combined in the first summing stage 132 and band-passed 134 to form a totally random chroma signal. The random luma and random chroma are combined in the second summing stage 126 and gated 118 on and off so as to generally fill the "edge-fill" region of the frame. The transition from edge-fill noise to standard video and back again, at the left and right sides of the frame, respectively, must be sufficiently random in time and gentle in amplitude so as not to permit detection; to this end, random noise generator #4 112 generates a random timing function using generator 114 which when filtered 116 is applied to the noise gate 118. The edges of the gating waveform are softened by the 200-nanosecond shaping filter 116 to avoid detectability of the gating function itself, and the resultant gated composite noise waveform is simply added linearly 120 at a suitable low level to the wobbled video signal. The output of the circuit of FIG. 5 is provided in the video output board (see below FIG. 9) at some suitable point, for instance into the luma blanking switch stage 414.

Note that the filter characteristics described above are indicative only; other cutoff frequencies, bandwidths and risetimes could be used as the application warrants.

SCRAMBLER INPUT BOARD

Figure 6:
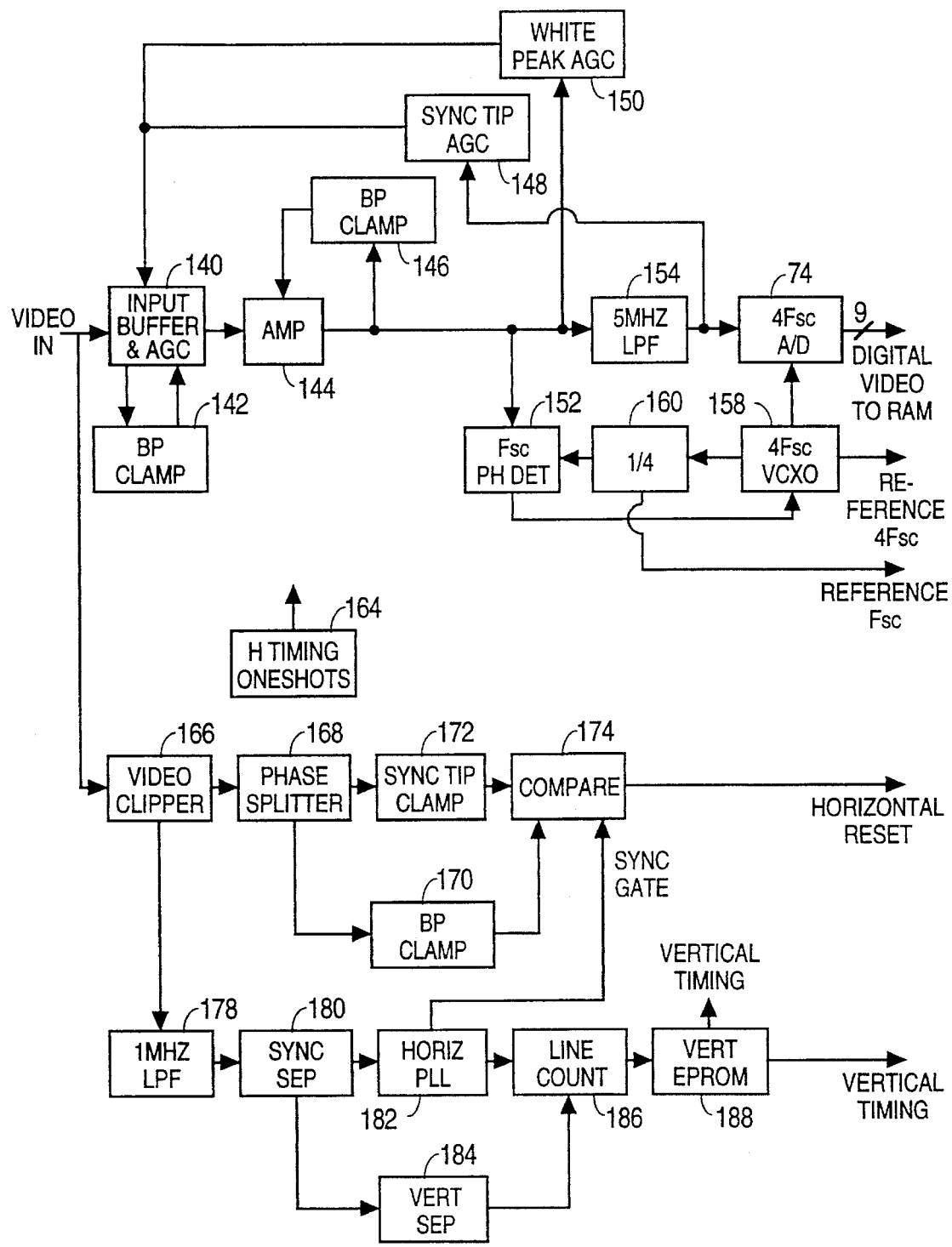
FIG. 6 shows a block diagram of the input board portion of the circuitry of FIG. 4.

FIG. 6 shows in detail the circuitry of the input board as discussed above which includes (with reference to FIG. 4), input buffer 66, genlock 68, clamping AGC circuitry 72, and video A/D circuitry 74. Each of the blocks shown on input board circuitry in FIG. 6 is conventional and well known in the video area. The clamping and AGC circuitry 72 of FIG. 4 is shown on FIG. 6 as including conventional AGC circuitry 140, amplifier 144, back porch clamp 146, amplifier 144, second back porch clamp 142 for the AGC circuitry 140, sync tip AGC circuitry 148 and white peak AGC circuitry 150. The genlock circuitry 68 is shown in FIG. 6 as including the 5 MHz low pass filter 154 which accepts the video input signal and provides it to the four times subcarrier frequency A/D converter 74 which outputs digital video to the RAM board discussed below. The genlock circuitry also includes the voltage control crystal oscillator 158 which is at four times the subcarrier frequency. This four times subcarrier frequency is then divided by four in divider 160 and provided to a subcarrier phase detector 152 which compares the output frequency from divider 160 to the colorburst of the incoming signal from amplifier 144. Thus this ensures that the voltage control oscillator 158 does operate in exact synchronicity with the incoming colorburst.

Thus the output of voltage control oscillator 158 is the reference frequency which is four times the subcarrier frequency. Also the output of divider 160 is the reference frequency subcarrier signal. Also provided as part of the input board are conventional horizontal timing one shots 164 which are for various internal timing purposes.

The lower portion of FIG. 6 shows the digital circuitry for generating the timing pulses for the horizontal reset signal which is provided to the RAM board as described below, as well as vertical timing for various internal purposes ("housekeeping").

SCRAMBLER CONTROL BOARD

Figure 7A:
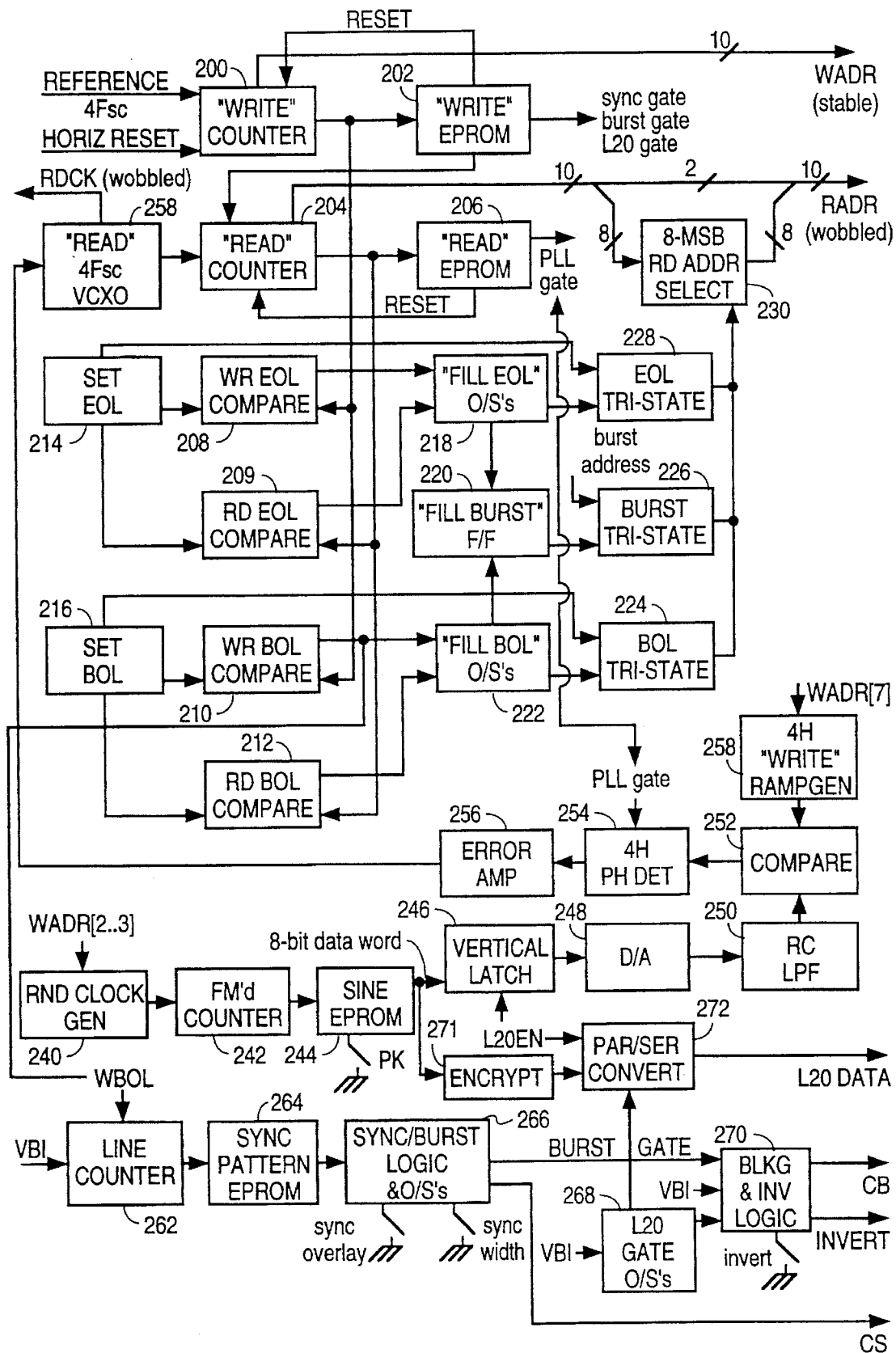
FIG. 7A shows a block diagram of the control board portion of the circuitry of FIG. 4.

FIG. 7A shows the control board which includes (referring to FIG. 4) the write address block 70, randomly varying number generator 88, data D/A 90, phase lock loop 92, read address block 94, and encryption circuitry 96. Beginning at the upper left hand portion of FIG. 7A, the reference 4 times subcarrier frequency and horizontal reset signals are received from the input board circuitry of FIG. 6. These input signals are then provided to the write counter 200 which generates the stable (non-wobbled) write address on a ten bit bus as shown. The output of the write counter is also provided to write EPROM 202 which at the proper point in the video line in response to the count from counter 200 outputs respectively signals for generating the sync gate, burst gate, and the line 20 gate signals, and for resetting the counter itself.

An output of the write EPROM 202 is also provided to read counter 204 for initial synchronization purposes. Read counter 204 outputs a count to the read PROM 206 which in response then generates the phase lock loop gating pulse. Blocks 208 through 230 and including also 258 generate the wobbled read address (RADR) which is used by the RAM board as described below for purposes of scrambling.

The lower line of circuit blocks of FIG. 7A provide the sync overlay concealment function i.e, the wiggled sync signal as a fixed pseudo-random pattern. The output CS designates composite sync. Beginning at the left hand portion of the bottom portion of FIG. 7A, the input signal is the vertical blanking interval pulse. This signal is used to reset a line counter 262 which is incremented by the write beginning of line (WBOL) command which comes from WBPL comparator 210.

The line counter 262 is used because in this particular embodiment the sync wiggle is provided in a fixed pseudo-random pattern on various lines of each video field. Thus one runs a line rate address count which is provided to a sync pattern EPROM 264 and line-by-line the sync pattern EPROM describes the off-set i.e., amount of wiggle that is desired on the horizontal sync pulse in each line. That offset value from EPROM 264 is applied to sync/burst logic and one shots 260 to generate the actual sync pulses. Circuit 260 is also controlled by two switches one of which is the sync overlay switch which determines if the sync overlay is functioning or not, and also a sync width switch which determines whether the width of the inserted sync signal is less than nominal. The output of the one shots in block 266 is the CS (composite sync) signal which is provided to the output board as described, and the burst gate signal which is provided to the blanking portion of the blkg/invert logic in order to "unblank" the colorburst. The sync width switch connected to circuitry 266 allows the reduction of width in the horizontal sync signal in order to accommodate the wiggle of sync. This is therefore non-network compatible video, i.e., non-NTSC standard video which in fact can be used successfully by most video equipment including standard television sets, but may upset or be affected by various types of transmission equipment.

The blanking and invert logic 270 receives the output signal from the sync/burst logic one shots 266 for purposes of performing inversion of video for further concealment under control of the attached invert switch. Thus the "invert" line which is one output of block 270 indicates that a given video line is inverted or not. CB refers to composite blanking which is provided as a control line to the output board for determining when to blank and when not to blank. The logic for video inversion as shown in block 270 is that in order to avoid clues to a pirate as to the presence of video inversion, when inverting it is desired that the colorburst remain noninverted. Thus the inverted line must be in its non-inverted position during the horizontal blanking interval. Thus block 270 is gated by both vertical blanking interval and also by the horizontal blanking pulse.

With reference to the concealment by use of overlays, the sync/burst logic and one shots 266 are controlled by a sync overlay switch as shown. It is possible to drive this switch by a random number generator (as described above with reference to FIG. 5) thus providing a random form of sync concealment. This "sync wiggle" has been found to operate well at 33° Hz. This, of course, does not provide any problem in removal of same by the descrambler which invariably regenerates new sync for each blanking interval in any case. Also, in accordance with the invention it is a further modification to "double-wiggle" the horizontal sync using two dissimilar frequencies to provide further concealment as in FIG. 5. Furthermore, it is also possible at the same time to vary the location of the vertical sync signals, i.e, a vertical sync wiggle, which would add further concealment.

The second to last row of circuit blocks in FIG. 7A begins with the random clock generator 240 which provides (in response to write address signals) random numbers to frequency modulated counter 242 which then causes the sine EPROM 244 to output an 8 bit data word to vertical latch 246. The sine EPROM 244 is controlled by a switch PK which enables or disables the EPROM and thereby turns the basic wobble "on" or "off." The 8 bit data word from the sine EPROM 244 is also encrypted in encryptor 271 and provided to a parallel to serial converter 272. Thus the 8 bit words output by the sine EPROM 244 are put into serial form and inserted as data on line 20 or thereabouts, as the application suggests, of the vertical blanking interval of each video field for transmission to the descrambler for descrambling purposes. Then the descrambler (as described below) removes the 8 bit data words, decrypts them and applies them to an identical set of circuitry for purposes of descrambling.

Frequency modulated counter 242, applied to sine EPROM 244, generates a randomly FM'd sine wave output, typically in the region of 3–15 Hz. The output of vertical latch 246 when enabled at line 19 of the VBI is then provided to digital to analog converter 248 to output an analog signal which is then smoothed by a conventional RC low pass filter 250 with a time constant of the order of 10 milliseconds, and provided to comparator 252, the second input of which is connected to a ramp generator 258 which provides in response to write address 7 line a ramp or "sawtooth" wave form at a rate of four times horizontal frequency.

Thus comparator 252 generates a set of moving edges which are moving in time exactly as it is desired for the picture to wobble. The 4H phase detector 254 compares those moving edges to a phase lock loop (PLL) gate signal from EPROM 206, thereby locking the read clock and the read address to those edges by means of error amplifier 256. The output of the error amplifier 256 is the amplified output of phase detector 254 which is provided to voltage controlled crystal oscillator 258 which is designated as the "read" oscillator and is operating at four times the subcarrier frequency (fsc). The output of voltage oscillator 258 is the read clock (RDCK). This read clock signal is thus wobbled i.e., operating at exactly four times subcarrier frequency but displaced from its nominal location by up to ±2 microseconds as controlled ultimately by the action of random number generator 240.

Thus read oscillator 258 provides a wobbled read clock signal RDCK, which is in contrast to the analogous oscillator 158 which provides a stable reference signal of 4 times subcarrier frequency reference signal. Thus these two oscillators 158 and 258 one of which (158) is stable and one of which (258) is wobbling provide timing signals applied to respectively the write counter 200 and the read counter 204 of FIG. 7a. Both counters 200, 204 are divide by 910 counters (since there are 910 cycles of subcarrier or cycles of four times subcarrier per NTSC video line); thus counters 200 and 204 are both running at the video line rate. This is conventional except that the read counter 204 is wobbling. The outputs of counters 200, 204 are provided respectively to the write address bus WADR which is stable and the read address bus RADR which is wobbled. Each of these buses are 10 bit width buses as shown.

With regard to the remainder of the circuitry shown in FIG. 7A, as discussed above if the active portion of the video on each line is moved to the right a gap is developed on the left edge which must be filled in; thus there are two points of interest in time at the left edge of each video line. The first point of interest is when it is needed to have the video (at the beginning of the gap) and the second time is when the video will be available (the end of the gap.) In between those two defined times it is necessary to provide an "edge fill" signal resembling the active video. It will be seen that these two times correspond respectively to the beginning of the active line for the write cycle and the beginning of the active line for the read cycle. (Given a standard, e.g. NTSC, input the beginning and end of the active line for the desired output signal.) It will be seen that an identical situation occurs on the right side of the picture when the picture is moved to the left. In this case the two times of interest are (a) when the read video has been exhausted and (b) when the video is no longer required. These two times correspond respectively to the end of the active line for the read cycle and the end of the active line for the write cycle.

The problem is that the read system and the write system are asynchronous, meaning that they cannot remain in the proper time relationship. Thus an interface is provided in which the address or addresses that are the desired beginning and end of the lines i.e., "BOL" and "EOL" for the write system and for the read system are defined. Then the write end of line (WREOL) comparator 208, the read end of line (RDEOL) comparator 209 and the write beginning of line (WRBOL) comparator 210 and the read beginning of line (RDBOL) comparator 212 compare the actual addresses coming out of the read counter 204 and the write counter 200 to the preset values corresponding to the desired read & write BOL & EOL. When these addresses match the preset values, that says that each counter has reached the point where it is desired to start filling in the active video, or has reached the point where it is no longer necessary to continue to fill in the video because now the actual active video is being provided (on the left edge) or the beginning of horizontal blanking interval has been reached (on the right edge).

Block 218 is the "fill end-of-line" one-shot circuitry, and below that is the "fill beginning-of-line" one-shot circuitry 222. For the left edge, the write beginning of line comparator 210 defines the left edge of the active video where it is desired to start the filling process. The read beginning of line comparator 212 determines when it is possible to stop the filling i.e., edge fill process. Thus both the outputs of comparators 210 and 212 are provided to the fill beginning of line one shots 222 and the output of one shots 222 is a pulse which is high only when is necessary to fill the left edge of the line. Thus the end of that pulse is moving with the wobble. On average, half the time that pulse is not provided because it is not necessary to fill in the left edge of the line because the picture has been moved to the left instead of to the right.

For the right edge of the picture, the fill end of line one shots 218 similarly are controlled by the write end of line comparator 208 and the read end of line comparator 209, and provide an analogous output signal looking for the end of each video or an active portion. Thus the "fill end-of-line" one-shots 218 generate a single pulse that is high when it is desired to fill the end of the line. The output of one shot circuits 218 and 222 are displaced from one another by the width of horizontal blanking; the inner edges correspond to the edge of formal blanking and the outer edges correspond to the edge of the moving active portion of video.

The portion in between the two pulses is the region in which a stable colorburst must be generated which matches in amplitude and phase the moving colorburst which intrinsically results from the wobbling read cycle. The "fill burst" flip flop is set by the trailing edge of the EOL pulse and reset by the leading edge of the BOL pulse. The "end-of-line" tri-state 228 looks at the address defined as the read endof-the-line (that is, the address which is to be used to fill the right-side gap period,) and similarly the "beginning-of-line" tri-state 224 provides an analogous signal for the left-side gap. For the "fill burst" region the address used is that of the center of colorburst. Thus under control of the command signals from the one shots 218 and 222, an address is either provided at the end of line or the address of the middle of the colorburst or the address of the beginning of the line as provided on the bus which is connected to the eight most significant bit read address select circuitry 230.

Note that all of the busses in the central portion of FIG. 7A are only eight bits wide, because it is the two least significant bits of the ten bit address system which are allowed to run (as described above). Thus the select circuitry 230 selects between three fixed addresses corresponding to the end of line, the colorburst, and the beginning of line. The burst (colorburst) tri-state 226 as shown is controlled by the output of the fill burst flip-flop and also by the burst address. The effect of setting the eight MSB's of the address buss to the address corresponding to the center of colorburst is to fill the entire read-cycle HBI with a continuous sine wave exactly matching the input colorburst, regardless of the wobble state. The desired output colorburst can then simply be gated out. Thus the select address provided on read address bus RADR switches between the actual running address count from the read counter 204 and the static states which are the output of the select circuit 230, which runs normally during active video but is frozen at the end of line, or beginning of line, and in the middle of the burst. Thus the ten bit read address is wobbled and at the desired intervals stops to perform the fill process.

Figure 7B:
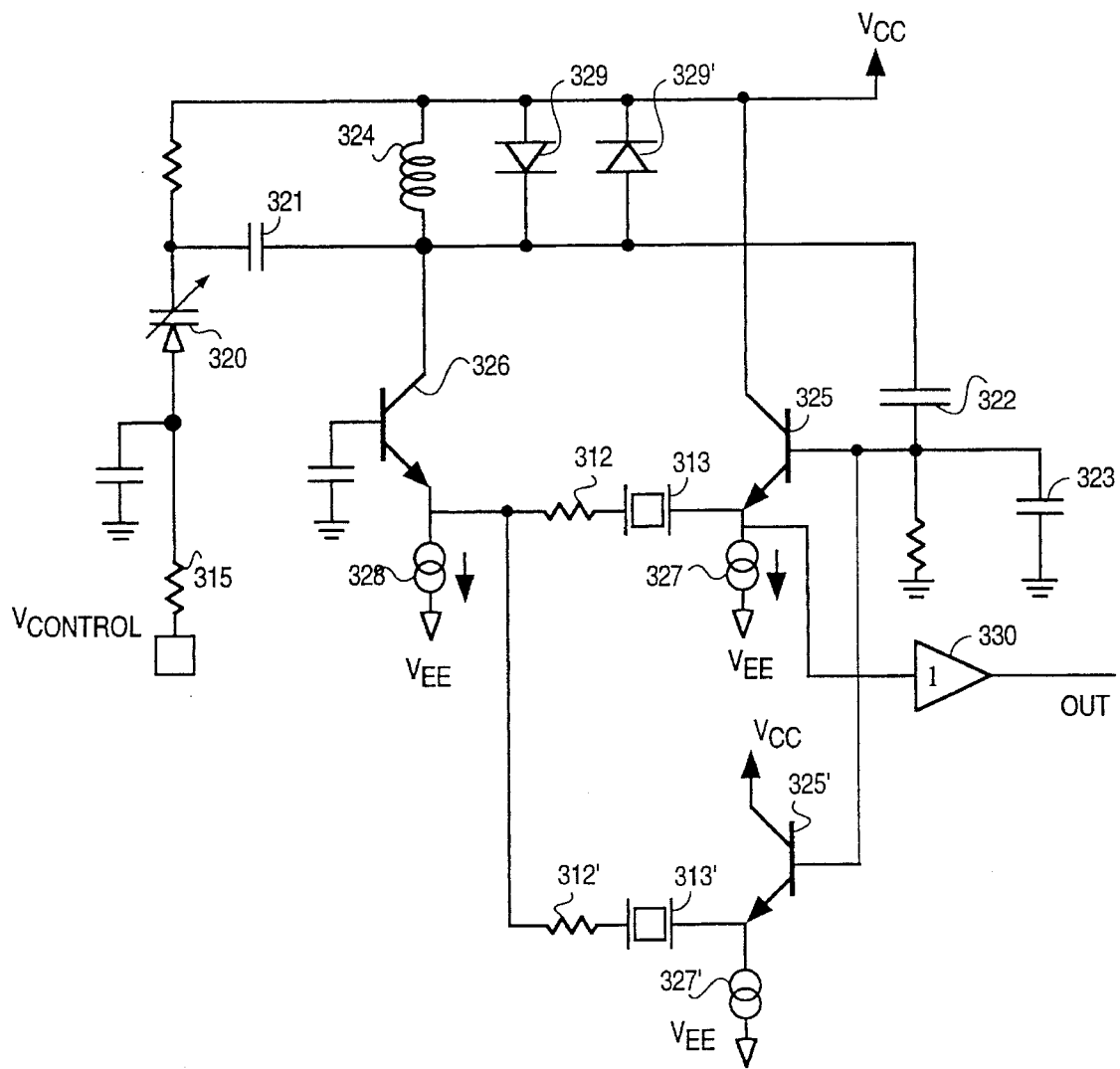
FIG. 7B shows the wide band oscillator portion of the circuitry of FIG. 7A.

The four times subcarrier frequency voltage controlled crystal oscillator 258 of FIG. 7A also described with other embodiments in copending and commonly owned U.S. patent application Ser. No. 08/202,349 entitled "Wide Frequency Deviation Voltage Controlled Crystal Oscillator", inventor Ronald Quan, attorney docket no. M-1854, incorporated herein by reference. FIG. 7B of the present disclosure is one embodiment of the wide frequency deviation voltage controlled crystal oscillator. In FIG. 7B the output signal ("OUT") corresponds to the wobbled read clock (RDCK) of FIG. 7A and the voltage control input ($V_{CONTROL}$) corresponds to the output of error amp 256 of FIG. 7A.

With reference to FIG. 7B, first crystal 313 is connected in series with resistor 312. The series combination of resistor 312 and crystal 313 is driven by a first driving transistor 325. Current supplies 327 and 328 connect the emitters of transistors 325 and 326 to a negative supply voltage $V_{EE}$ and the collector of transistor 325 to a positive supply voltage $V_{CC}$. The phase control circuit includes a varactor (voltage controlled variable capacitor), diode 320 along with capacitors 321, 322 and 323 and an inductor 324. The phase imposed by the phase control circuit is varied by adjusting the $V_{CONTROL}$ which changes the capacitance of the varactor diode 320. Diodes 329, 329' limit the amplitude of the oscillations in the circuit.

A second transistor 325', a second crystal 313' and a resistor 312' are connected in parallel with first transistor 325, first crystal 313 and first resistor 312. The emitter of transistor 325' is connected to a current source 327' to negative supply voltage $V_{EE}$, and a collector of transistor 325' is connected to positive supply voltage $V_{CC}$. Crystals 313 and 313' are driven in-phase with each other. The varactor diode 320 has a relatively low ratio (i.e. 2:1) of maximum to minimum capacitance.

The resonant frequencies of crystals 313 and 313', respectively, are selected such that they are spaced at a predetermined interval (e.g. 3 KHz). The value of resistors 312 and 312' is typically about 150 to 300 ohms. Unity-gain buffer 330 provides the output signal.

SCRAMBLER RAM BOARD

Figure 8:
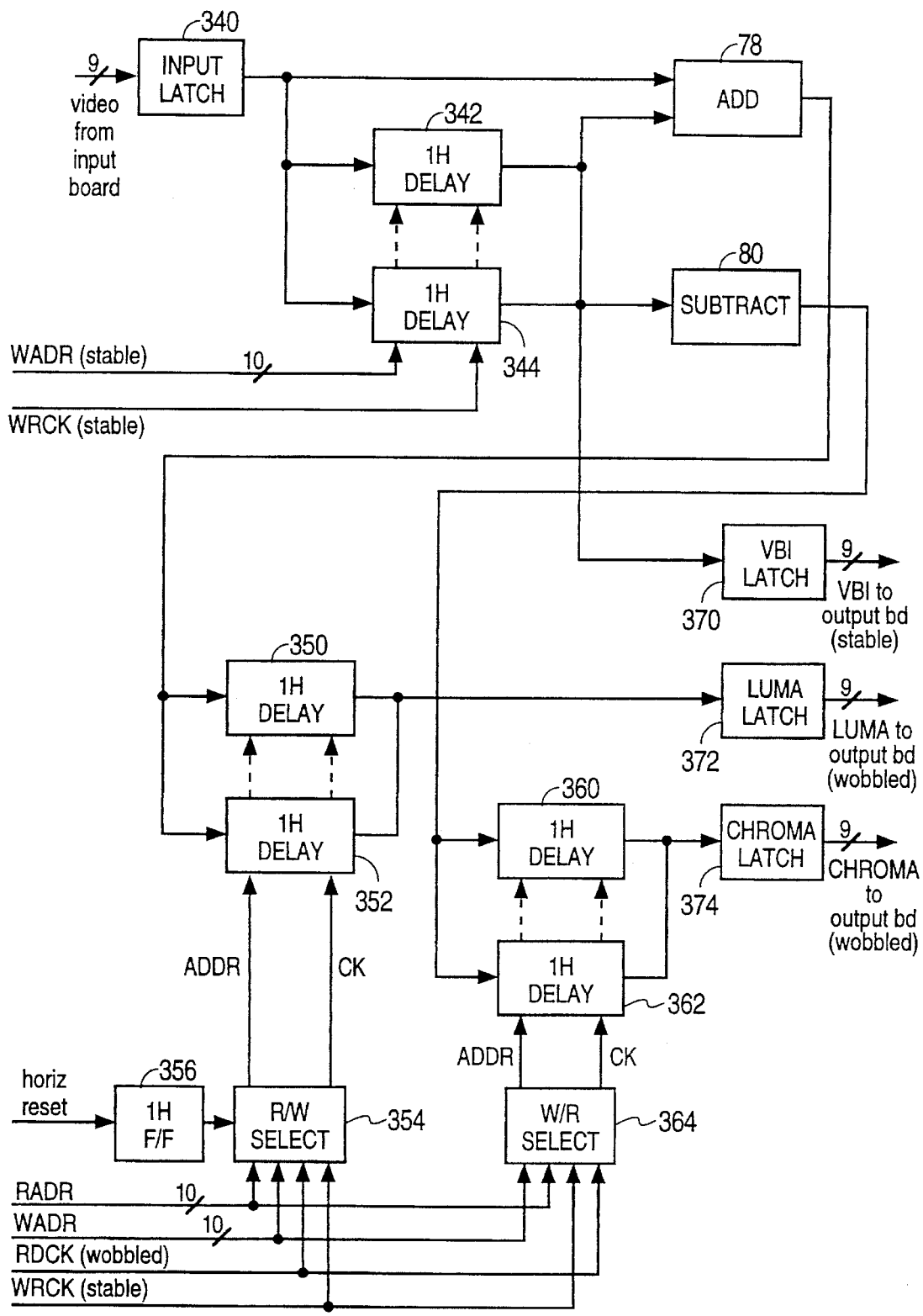
FIG. 8 shows a block diagram of the RAM board portion of the circuitry of FIG. 4.

FIG. 8 depicts in detail the RAM board which includes certain blocks of FIG. 4 including buffer 76, adder 78, subtractor 80, Y buffer 82, and C buffer 84. As shown in FIG. 8, there is an input latch 340 (not shown in FIG. 4) receiving the video from the input board and supplying same to ping-pong RAM buffer 342, 344. Adder 78 and subtractor 80 as shown in FIG. 8 are the same as in FIG. 4. The buffer 82 for the Y luminance channel of FIG. 4 in FIG. 8 is shown as a ping-pong RAM including dual RAM banks 350 and 352 each of one horizontal line (1H) length. Similarly, the buffer 84 for the chrominance channel of FIG. 4 is shown in FIG. 8 as being ping-pong RAM 360, 362.

Both the luma and chroma channel which are desired to be wobbled must switch from the write address system to the read address system because the write address and the write clock are stable as coming in, i.e. WADR and WRCK, whereas the read address RADR and read clock RDCK are both wobbled. The selector circuits 354 and 364 steer the clocks and address busses respectively for the luma channel and the chroma channel so that at any given video line one of the buffers in each pair of buffers 350, 352, and 360, 362 is writing and the other is reading. The horizontal blanking interval reset signal is provided to the 1H flip-flop 356 for control of the select circuitry 54 so that the buffer pairs alternate reading and writing appropriately.

SCRAMBLER OUTPUT BOARD

The output board portion of the block diagram of FIG. 4 includes the chroma D/A converter 98, the luma D/A converter 104, the vertical blanking interval D/A converter 100, the heterodyne circuit 100, the video adder 102, the output driver 110, the VBI/HBI regeneration 108.

Figure 9:
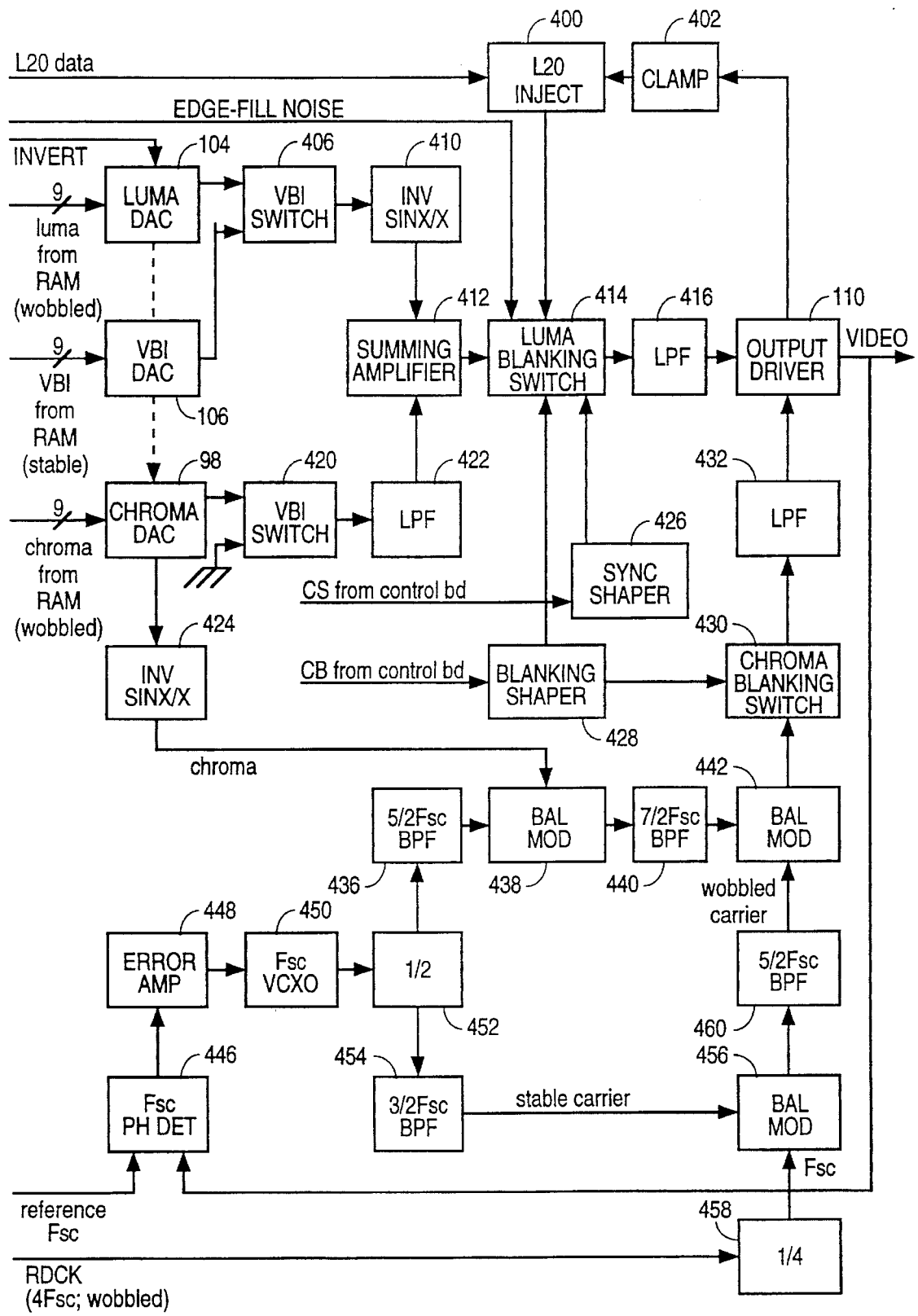
FIG. 9 shows a block diagram of the output board portion of the circuitry of FIG. 4.

As can be seen in FIG. 9 showing the output board, the luma DAC (digital to analog converter) 104, VBI DAC 106, chroma DAC 98, and output driver 110 are the same blocks as in FIG. 4. Additionally, FIG. 9 shows the line 20 data at the upper left hand portion of the figure which is provided as discussed above from the control board of FIG. 7A going to a line 20 inject circuitry 400 which is then provided to luma blanking switch 414. Additionally, the video invert signal also provided as shown in the lower right hand portion of FIG. 7A is provided in the upper left hand portion of FIG. 9 to the luma DAC 104 which also receives the luma digital signal from the RAM board output bus as shown. Additionally, the digitized vertical blanking interval signal from the RAM board (which is time stable) is provided to the VBI DAC 106 and the chroma digitized signal from the RAM (which is wobbled) is provided from the RAM board also to chroma DAC 98; the chroma DAC is controlled by the source video invert signal as is the luma DAC.

The VBI switch 406, controlled by the VBI signal, switches in the vertical blanking interval as desired in the appropriate portion of the signal. The output of VBI switch 406 is then filtered by a conventional inverse sine X/X type filter to compensate for sampling-induced high frequency roll off. The output of the filter 410 is then provided to summing amplifier 412. The output of summing amplifier 412 is provided to the luma blanking switch 414.

The "fill burst" action replaces the entire HBI signal with continuous burst at the output of the RAM board. The action of the luma blanking switch is to re-insert H blanking and H sync, and to get the continuous burst to form the expected colorburst, thereby regenerating the desired HBI format. The output of luma blanking switch 414 is then being filtered by low pass filter 416 for removing the extraneous sampling sideboards frequencies above about 5 MHz. The output of low pass filter 416 then is provided to the output driver amplifier 110.

Similarly, the output of the chroma DAC 98 is connected to vertical blanking interval switch 420 for switching out the chroma signal during vertical blanking. The output of the vertical blanking switch 420 is then subject to low pass filter 422 to remove the chroma frequencies above about 2 MHz and then also subject to the black clipper 412 and hence follows the same path as described above for the luma DAC.

With regard to restoration of the vertical detail from the chroma channel output, this is performed by the output board circuitry of FIG. 9. As shown, this takes place except during vertical blanking under control of vertical blanking switch 420 which switches out chroma during vertical blanking. This chroma signal during the active video portion of the line is filtered by low-pass filter 422 and black clipped at summing amplifier 412 and recombined with luma, thus restoring the missing vertical detail. This is because the missing vertical detail appears in the chroma channel, so low pass filtering removes the chroma content, leaving only the vertical detail, and adding it back to the luma channel restores the missing vertical detail. Sync shaper 426 and blanking shaper 428 convert the logic-level CS (composite sync) and CB (composite blanking) signals to analog signals of the required levels and having the standard rise and fall times, i.e., 140 microseconds for NTSC.

The lower part of FIG. 9 is the heterodyne circuit 100 of FIG. 4. As shown, analog chroma data from chroma DAC 98 is provided to an inverse sine X/X filter 424 to restore losses in high frequencies due to sample and holding in A/D. This filtered chroma signal (which is wobbling in time) is not however at the nominal 3.58 MHz subcarrier frequency. Thus this signal is provided to balance modulator 438 for further processing.

Subcarrier frequency voltage controlled crystal oscillator 450 is part of a loop including subcarrier frequency phase detector 446 which drives error amplifier 448 which in turn drives subcarrier frequency voltage control oscillator 450. The output of frequency control oscillator 450 is divided by 2 by divider 452 to provide a frequency one-half of the subcarrier frequency. The output of divider 452 is provided to two band pass filters 436, 454; the first filter 436 passes only the fifth harmonic of half of the subcarrier frequency i.e., 5/2 Fsc. The second band pass filter 454 is passing only the third harmonic, i.e. 3/2 Fsc. Band-pass filter 454 then outputs the stable carrier 3/2 $F_{SC}$ signal which is applied to balance modulator 456 which mixes this with the divided-by-4 Read clock signal (RDCK) which is wobbled and is equal to (four times the subcarrier frequency/4).

This RDCK signal is divided by four at divider 458 thus outputting the wobbled subcarrier frequency, which at balance modulator 456 is modulated with the 3/2 of the subcarrier frequency. The output of balance modulator 456 is then filtered at band-pass filter 460 to select the 5/2 of subcarrier frequency (upper sideband) which contains the wobbled subcarrier frequency. In the figure, this is labeled "wobbled carrier" and is then applied to balance modulator 442.

The upper arm of the heterodyne circuit as shown accepts the fifth harmonic of the stable subcarrier frequency divided by 2 from band-pass filter 436 and modulates that at balance modulator 438 with the wobbled chroma from filter 424. The output of balance modulator 438 is then filtered by band-pass filter 440 (having a pass band about 3 MHz wide) to select the 7/2 of the subcarrier frequency. The output of band-pass filer 440 is then 7/2 of subcarrier frequency (upper sideband) which contains wobbled chroma, which when mixed in balance modulator 442 with the wobbled carrier provides a stable chroma signal at 3.58 MHz (to the chroma blanking switch 430) via lower sideband output of balance modulator 442.

The object of this heterodyne circuit is that the amount of wobbling (jittering) of the video line is well known via the master clock, via the read clock (RDCK) timing signals. That is, this master clock's signal is actually tied to the changes in frequency in proportion to the changes in the scrambled chroma frequency, i.e., the wobbling. Thus this read clock signal can be used as a form of cancellation to remove the wobbling from the chroma signal in terms of the frequency. As shown, the burst signal which helps control subcarrier frequency phase detector 446 is the colorburst signal from the output video. The video output colorburst thus matches the input video source colorburst.

Figure 10A:
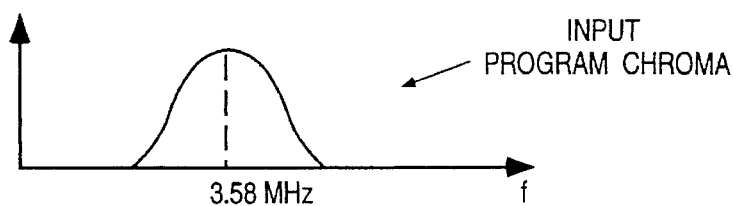
FIGS. 10A, 10B, 10C, 10D, and 10E show spectra depicting a heterodyne function performed by the circuitry of FIG. 9.
Figure 10B:
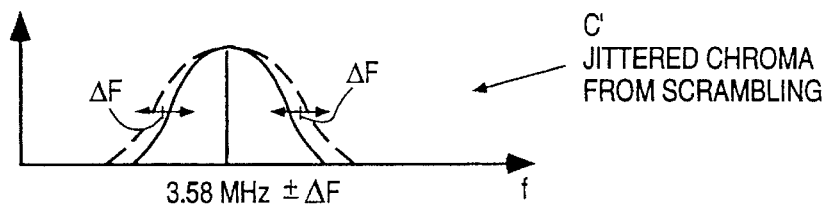
Figure 10C:
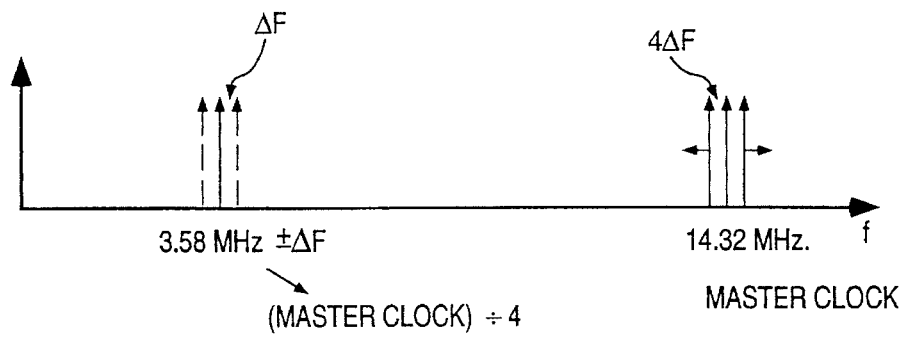

The operation of this heterodyne circuit is shown with further reference to the frequency spectra of FIGS. 10A through 10E. Starting with FIG. 10A, the input program chroma signal (prior to scrambling) is shown distributed over a spectrum centered at 3.58 MHz i.e., the subcarrier frequency. Upon scrambling in FIG. 10B, the wobbling chroma which is provided from the chroma DAC 98, is shown "jittering" (wobbled) by $\Delta F$ and having a center frequency of 3.58 MHz$\pm\Delta F$. The master clock at the same time is "jittering" (wobbling) by exactly the same amount at four times the subcarrier frequency, i.e., centered at 14.32 MHz with a jitter of 4 times $\Delta F$, as shown in FIG. 10C. This is because the wobble in the chroma is exactly one-quarter of the master clock.

Figure 10D:
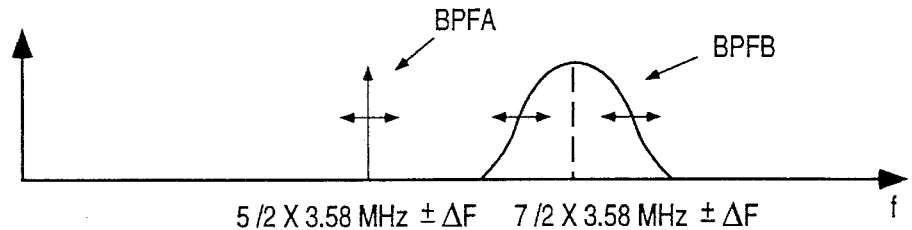
Figure 10E:
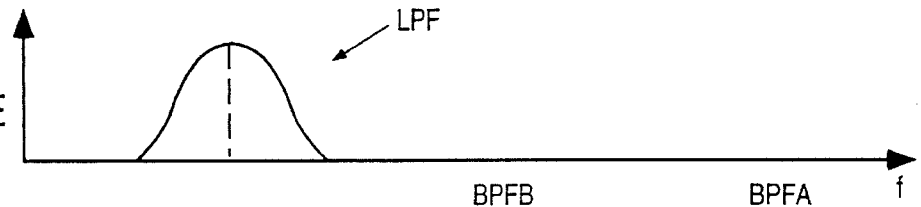

As shown in FIG. 10D, by band-pass filtering the heterodyne circuit selects 7/2 of subcarrier frequency which confirms wobbling chroma and the 5/2 of subcarrier frequency, both of which include the same amount of wobble, i.e., $\pm\Delta F$.

Thus by subtracting out (modulating and selecting the lower sideband) the 7/2 of subcarrier frequency chroma from 5/2 subcarrier frequency (both of which include the $\Delta F$ wobbling), one arrives at the output of the low-pass filter which is a stable 3.58 MHz and which is the desired stable chroma signal.

Figure 11:
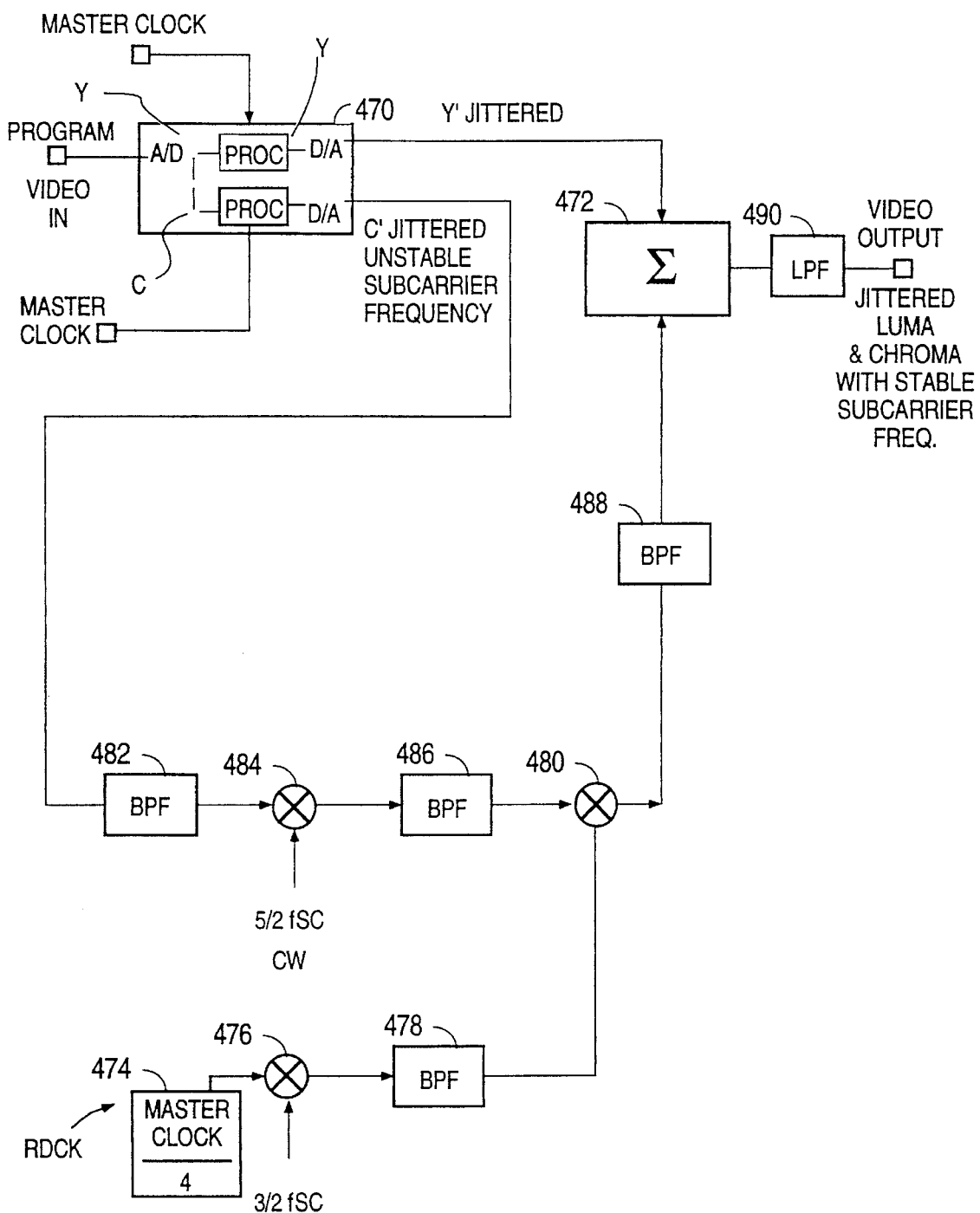
FIG. 11 shows in block diagram form another version of the heterodyne circuitry of FIG. 9.

FIG. 11 shows a different version of the heterodyne circuit in accordance with the invention as applied to the above-described scrambling system. As shown, the master clock varies in frequency by $\pm 4$ times $\Delta F$ due to the scrambling process, in order to cause the desired wobbling in the video thereby scrambling the video. The "program in" video is digitized by the A/D converter in block 470 and separated into the Y (luminance) and C (chrominance) channels, each of which is processed to be wobbled by the master clock by $\pm 4$ $\Delta F$. After the master clock varies both Y and C components i.e., wobbles them in a time-varying way, the C chrominance component has color frequencies that are undesirably not stable ("jittered"). Thus the object of the heterodyne circuit is to stabilize the scrambled chrominance component frequency so that the television receiver can view the color with use of a simple low-cost descrambling device.

It is known that the master clock is at 4 times subcarrier frequency $\pm 4$ $\Delta F$. As shown, after the digital processing, both the Y and the C signals are converted back to analog by D/A converters in block 470, thus outputting the so-called "Y" jittered (wobbled) signal and the "C'" jittered (wobbled) signal which is the undesirably unstable carrier frequency. The heterodyne circuit at the lower left-hand portion of the figure applies the master clock signal (which is also designated the RDCK signal) which is divided by 4 at divider 474 and which is then multiplied by a stable ³⁄₂ times the subcarrier frequency by balance modulator 476. As noted, the subcarrier frequency is 3.58 MHz. The upper sideband of the output of balance modulator 476 is selected by band-pass filter 478 to obtain ³⁄₂ of the frequency subcarrier plus the subcarrier frequency ±ΔF. At the same time the C' (wobbled chroma) component which is subcarrier frequency ±ΔF is first filtered at hand pass filter 482 by the inverse sign X/X filter 424 of FIG. 9. The output of band-pass filter 482 is then multiplied by a stable ⁵⁄₂ subcarrier frequency signal at modulator 484 and the output of modulator 484 is filtered at band pass filter 486 to pass the upper side-band to provide ⁷⁄₂ times the subcarrier frequency ±ΔF.

As noted above (see FIG. 9), the stable ³⁄₂ subcarrier frequency and ⁵⁄₂ subcarrier frequency are provided from a phase-locked voltage controlled oscillator that is locked to incoming stable video color frequency, i.e., the reference subcarrier frequency. The outputs of band-pass filters 478 and 486 are multiplied by balance modulator 480 and then filtered at band-pass filter 488 so that the lower sideband output is a chroma signal at frequency subcarrier which is free of the ±ΔF wobble. As shown in FIG. 9 (but not in FIG. 11), the burst from the output low pass filter 432 is sent back to the phase detector 446 to phase lock the subcarrier frequency voltage control oscillator 450 to incoming video color frequency. As shown in FIG. 11, the output chroma signal from band-pass filter 488 is then added by a video adder to the wobbled luminance signal Y', the output of which is low-pass filtered at 490 to provide the output video which includes the wobbled luminance signal and a wobbled chroma signal with stable subcarrier frequency.

In conventional heterodyne color stabilizers the master clock/4 is really the colorburst from the input video. This could have been done here as well in a similar way by taking the wobbled colorburst from inverse Sin X/X filter 424; but the color stabilization would not have been effective and thus more would be chroma unstable. For the best chroma stability RDCK (unique to this system) is used as described above.

With regard to the above-described heterodyne circuit, its applicability is in addition to use in scrambling. For instance, it is suitable for use with any sort of video processing which involves time-base errors.

DESCRAMBLER

The wobbled video output signal from the encoder or scrambler circuitry of FIG. 4 is transmitted conventionally by coaxial cable, satellite, broadcast television, cable television or otherwise to a descrambler (decoder), which typically is located in a home and the descrambled output of which is connected to a conventional home television set or monitor. One of the objects of the present invention is to provide a system which is highly secure, offers adequate concealment, and yet compatible with a low cost and reliable decoder. This is because there are thousands or tens of thousands of decoders made and used and hence, is essential that they be relatively low cost and require little servicing since they are located at the home. Note that this is not the case with the scrambler which is typically located at a head-end and of which there are relatively few (one per TV channel) in any one television system.

Figure 12:
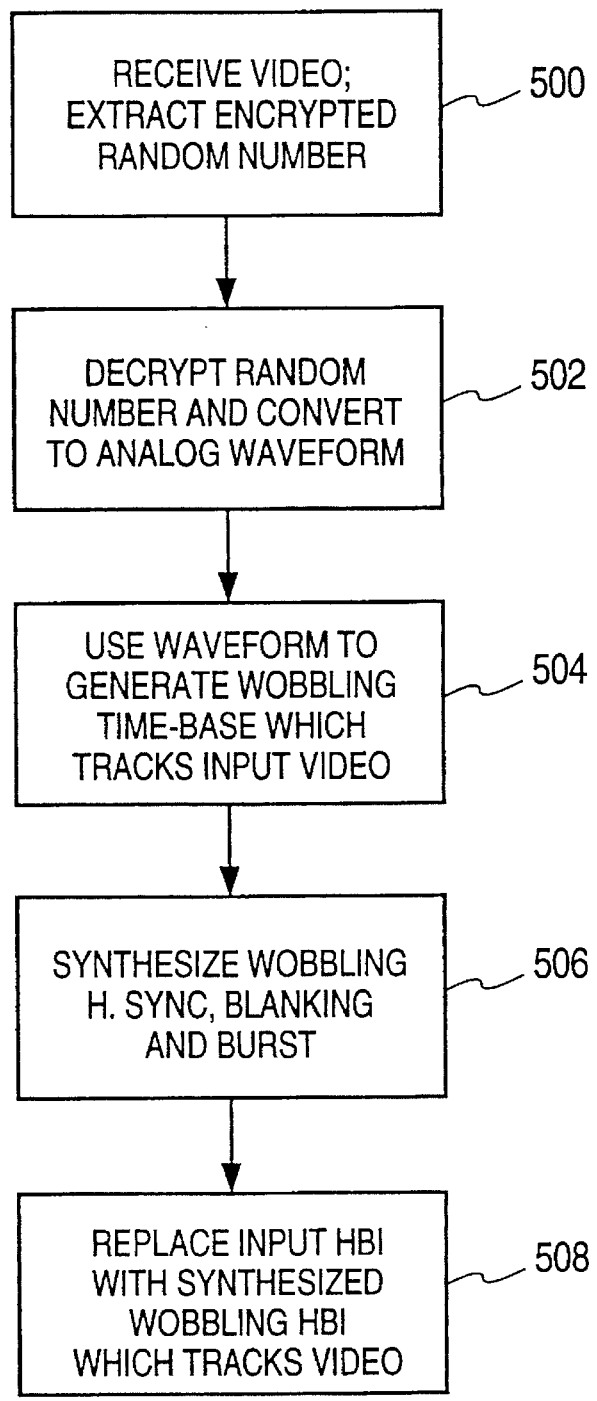
FIG. 12 shows a flowchart of the descrambling process in accordance with the present invention.

FIG. 12 is a flowchart of the descrambler signal processing. In step 500 the scrambled video is received and the encrypted random number (which is the decoding seed) extracted. From this extracted number, in step 502 the random number is decrypted and converted to an analog wave form. Then in step 504, this analog wave form generates a wobbling time base which tracks the input video, i.e., includes the information necessary to indicate exactly how the video is wobbling. From that data it is possible to synthesize in step 506 the required wobbling horizontal sync, blanking, and colorburst. In step 508 the input signal's complete horizontal blanking interval is replaced with a complete synthesized wobbling horizontal blanking interval made up from the synthesized sync, blanking, and colorburst which tracks the video, thus allowing the signal to be viewed on a conventional television receiver.

Figure 13:
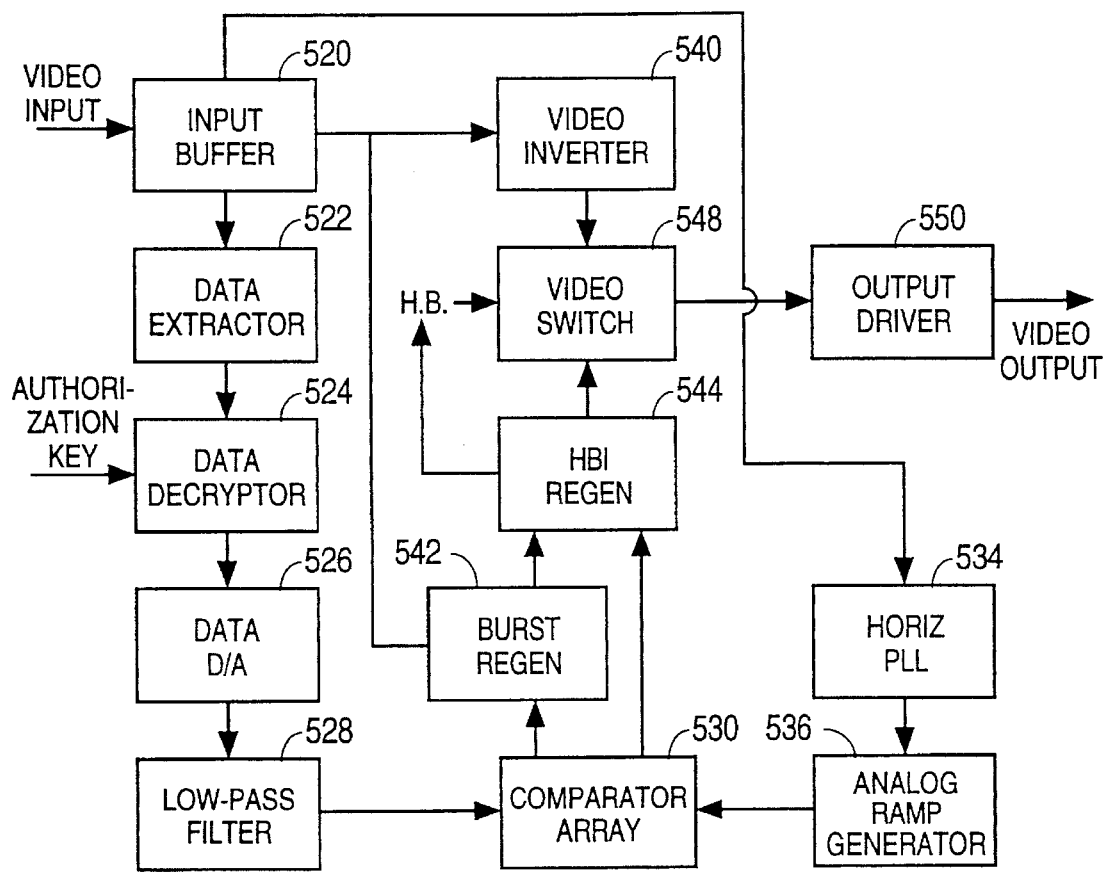
FIG. 13 shows a block diagram of a descrambler in accordance with the present invention.

FIG. 13 shows in block diagram form one embodiment of the decoder for performing the processing of FIG. 12. In the upper left hand portion the scrambled video input signal is provided to an input buffer 520. In the descrambling data path, the data is extracted by data extractor 522 and then conventionally decoded by decryptor 524. The data has been converted from digital to analog form in block 526, smoothed by low pass filter 528 and provided to comparator array 530.

Meanwhile phase lock loop 534 is locked to the horizontal line rate of incoming horizontal sync, to drive an analog ramp generator 536. The comparator rate 530 then compares the horizontal ramp with the varying DC (direct current) signal coming out of low pass filter 528 to provide a moving edge at the point at which they cross, i.e. where the comparison is made, from which edge it is possible to time scale all elements of the horizontal blanking interval.

This comparator data is then used to generate burst, horizontal sync, and blanking pulses using colorburst regenerator 542 and horizontal blanking interval regenerator 544 which are applied to video switch 548. Video switch 548 switches between the active video which (with one exception) is not to be processed by the descrambler and the horizontal blanking interval which is processed by the lower portion of the circuitry of FIG. 13. The video switch 548 is driven by the regenerated horizontal blanking.

The input video from buffer 520 is processed by the descrambler only to the extent that the video is re-inverted wherever it has been previously inverted by the scrambler in order to restore the original video. This now fully non-inverted video is provided to video switch 548, the output of which then is provided to output driver 550 for the video output to the TV receiver or monitor.

Figure 14A:
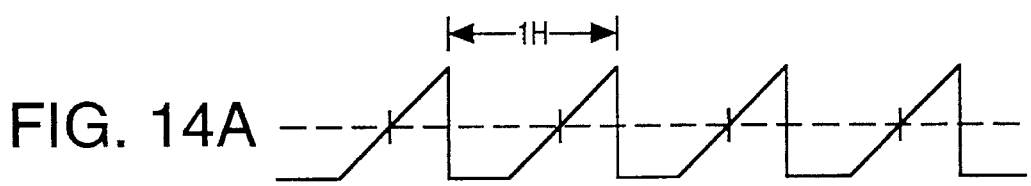
FIGS. 14A, 14B, 14C depict waveforms relating to the descrambler of FIG. 13.

The analog ramp generator 356 generates a series of waveform ramps as shown in FIG. 14A which are clocked with horizontal sync from PLL 534. As shown in FIG. 14A each ramp has the duration adequate to cover the entire regenerated HBI including the wobble—that is, around 20 microseconds. Thus the comparator compares the ramps with a reference voltage which is shown as a horizontal line in FIG. 14A. The comparator provides as output the square pulses shown in FIG. 14B each of which is wobbling in time synchronously with the wobble present in the input video, as shown by the horizontal arrows at the leading edge of each horizontal pulse in FIG. 14B.

Figure 14B:
Figure 14C:

As shown in FIG. 14B, there is one such square pulse output of the comparator for each video line. Thus this edge moves in time synchronously with the wobble. Then using the single wobbling edge for each line as shown in FIG. 14B, it is possible fully to reconstruct the horizontal blanking interval, as shown in FIG. 14C by the vertical arrows which indicate six edges which are: (1) the leading edge of horizontal blanking; (2) the leading edge of the horizontal sync pulse; (3) the trailing edge of the horizontal sync pulse; (4) the leading edge of colorburst; (5) the trailing edge of colorburst; and (6) the end of the horizontal sync pulse. In accordance with one embodiment of the invention, this is done by providing an array of six different comparators each with an offset to the preceding one. Alternatively a single comparator would generate the first edge and then a sequence of timed one-shots would provide the other five edges of the horizontal blanking interval.

Figure 1A:
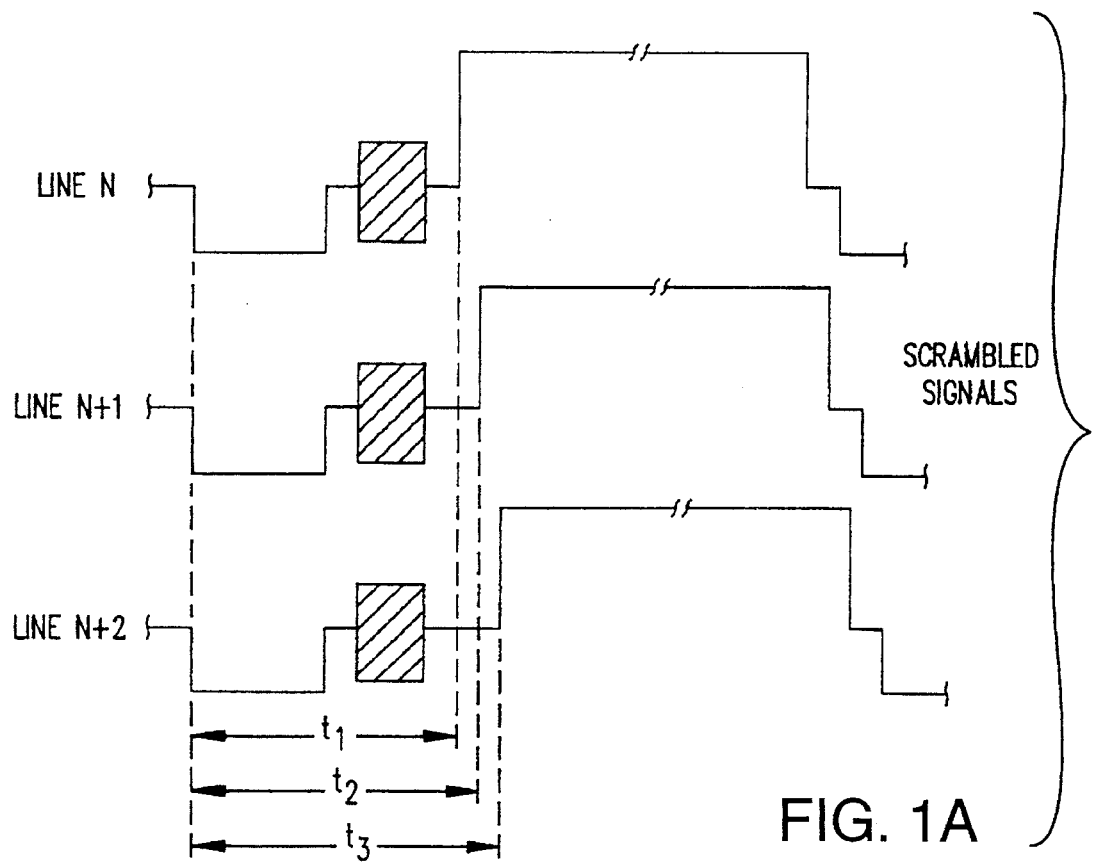
FIGS. 1A and 1B show scrambled and descrambled signals as disclosed in U.S. Pat. No. 5,058,157.
Figure 1B:
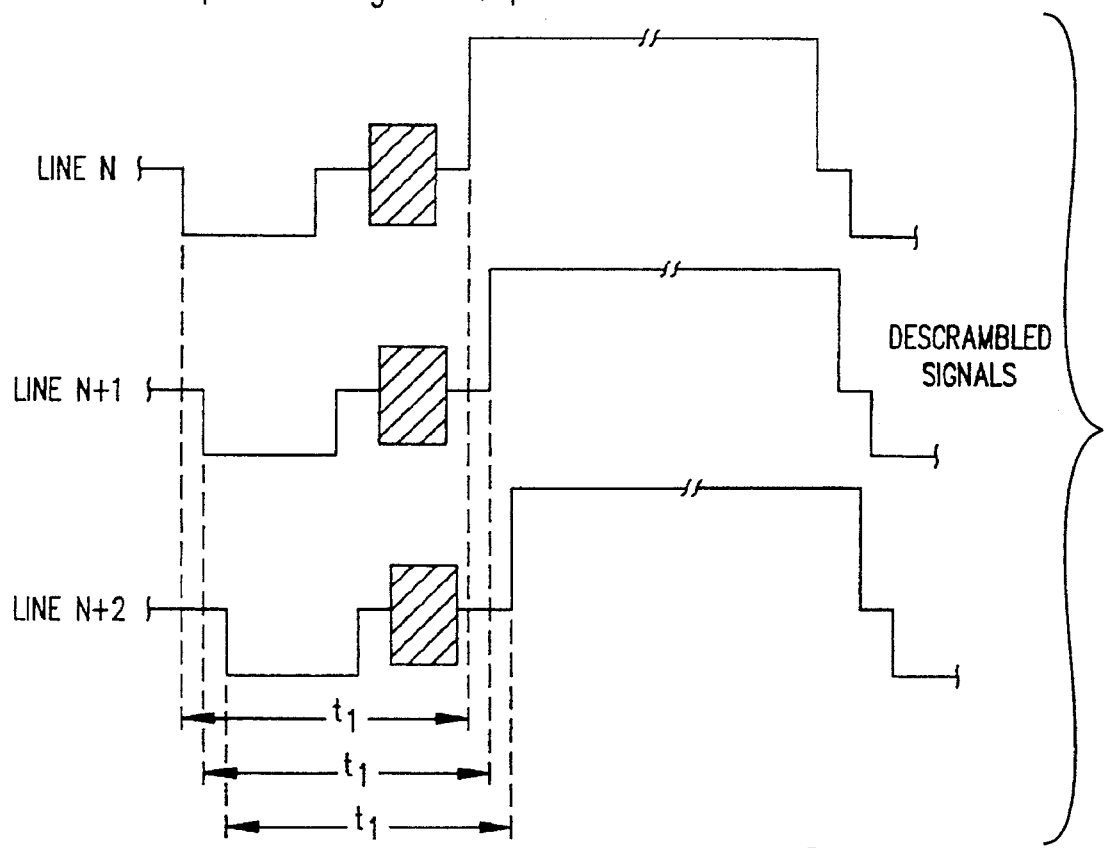

The chief task of the descrambler, in addition to removing the inversion of the active portion of the video, is to generate a horizontal synchronization pulse which moves in exact synchronism with the time induced wobble and a colorburst which moves in exact synchronism with the time-induced wobble. The restoration of the sync pulse is relatively straightforward, but the restoration of the colorburst is more difficult as shown with reference to FIG. 1B. In line N the colorburst occurs in time advanced as regards to location of the colorburst in line N+1 and the colorburst in line N+2 is retarded relative to the location of the colorburst in line N+1. Thus the descrambler must provide a sine wave which matches in amplitude and phase a colorburst which has not yet occurred for certain particular lines.

Thus the circuitry must anticipate the location of colorburst for particular lines. This is performed in the descrambler in one embodiment by using the colorburst to ring a crystal filter in the burst regenerator 542 of FIG. 13, so that the filter rings at the same amplitude and phase for an entire line thus generating a continuous wave having the same amplitude and phase as the colorburst. This typically requires two cascaded oscillating crystals to provide a filter that rings well enough (that is having a high enough Q) so that the output has not dropped away to zero prior to the end of the video line.

Figure 15A:
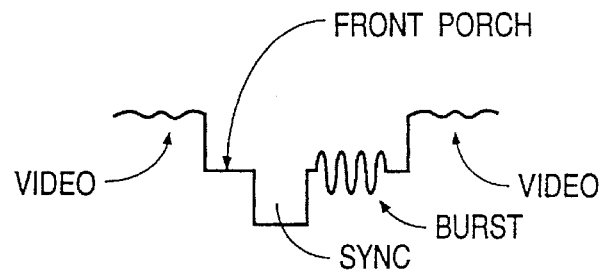
FIGS. 15A, 15B, 15C show the use of pre-burst in the scrambler of FIG. 4.
Figure 15B:
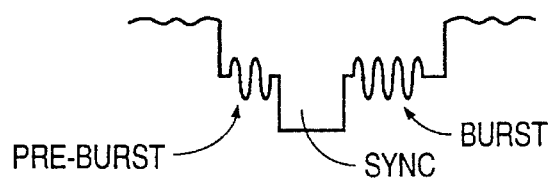

One improvement in accordance with the invention over use of these two cascaded crystals is to provide a non-standard form of the colorburst, by dividing the colorburst into two portions (or more) in the scrambler. FIG. 15A shows a conventional RS-170A horizontal blanking interval with colorburst ("burst") on the back porch. FIG. 15B shows in accordance with the invention that instead a first portion of the burst is a pre-burst portion provided on the front porch of the horizontal blanking interval of each video line, with the remaining of the colorburst located conventionally on the back porch of HBI. Thus there would be no need to make the crystal filter ring for more than about 5 microseconds i.e., not even the full duration of horizontal blanking. This has the advantage of allowing use of a simpler and less expensive descrambler, but is a non-standard format due to the need for the provision of the pre-burst. This therefore, is a non-network transparent, i.e., non-NTSC compatible system suitable for use with for instance a video cinema application.

Figure 15C:
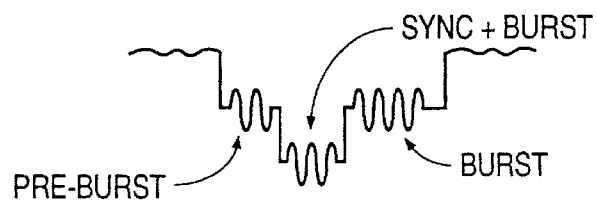

An alternative approach (shown in FIG. 15C) is to superimpose a continuous "colorburst" upon the entire HBI—that is, start "burst" at the beginning of blanking and let it run all the way through, adding the sync pulse linearly.

DESCRAMBLER WITH DIGITAL SYNTHESIS OF HBI

The above described descrambling process involves synthesizing (regenerating) horizontal sync, blanking, and colorburst that track the video "wobble", and replacing the incoming standard sync, blanking and burst with them to form a video signal having a unified time-base variation (the "wobble"), which the TV receiver can track in order to present a stable, "descrambled" picture.

In another embodiment those sync, blanking, and burst signals are generated digitally in the descrambler. The subsequent insertion into the analog signal, and all of the video signal processing (clamping, AGC, inversion, etc.) remain in the analog domain as with the above described "analog" embodiment of FIG. 13.

The following circuitry is for NTSC; PAL works similarly but with different numerical values, as will be apparent to one skilled in the art. The horizontal offset required for each line's horizontal blanking interval (HBI) is mathematically calculated based upon some suitable interpolation algorithm from the field-rate data byte sent in the vertical interval. That offset is applied as a preset or preload to a "divide-by-1820" counter running at 8 times subcarrier frequency, nominally organized so that the counter counts out the entire line—that is, the count of 1820 takes 63.555 microseconds. It will be seen that, if the counter is preset with a value of, say "10", the counter will finish with its count to 1820 in a time 349 nanoseconds sooner than if it had not been so preset. If the counter is in fact designed to count to 1880, and provision made for preloads ranging from 0 to 120, the net effect is that the line-time as set by the counter can be varied by ±2 microseconds, in increments of 35 nanoseconds.

In practice, with the present scrambling process, the line-to-line variation of line length is no more than 10 nanoseconds; thus the counter need only achieve a count of 1820+/−1, or 1821 with a preset ranging from 0 to 2. (It will be seen that the time offset accumulation over 240 lines in a single frame, at 10 nanoseconds/line, is 0.4 microseconds).

Then referring to the block diagram of FIG. 16A, the top row of blocks is the analog video processing corresponding to the similarly numbered elements of FIG. 13. In the second row, an oscillator 578 operating at 8* Fsc is phase-locked to incoming colorburst by the subcarrier PLL 576. Its output is divided by eight at divider 580 to produce a 3.58 MHz signal which is gated by burst gating 582 to form the new colorburst, as well as providing a clock for the 1:1880 counter 588.

In the third row, the data byte in the vertical interval is separated from the incoming video and decrypted in block 584, and supplied to the line-offset calculator 586 (a microprocessor). The calculator 586 calculates in real time the line-by-line offset required to fit the vertical-rate data byte, and supplies that number (still in real time) to the divide-by-1880 counter 588. The calculator 586 can be simple since at most it only has to calculate one number to eight-bit precision every 63.555 microseconds; moreover, it will generally have at least four lines (or 245 microseconds) in which to work. In an alternative embodiment of FIG. 16B (otherwise similar to that of FIG. 16A), in order to reduce the required clock speed without degrading the fineness of time resolution, the system runs at 4* Fsc instead of 8* Fsc, and the counter is preloaded with only the 7 most significant bits of the offset word. This limits the shift to a minimum increment of 70 nanoseconds; the last bit (LSB) which defines the 35 nanosecond shift is used to invert the clock in an XOR gate 587. The inversion causes the "trailing edge" to be the active edge instead of the "leading edge", into latch 589, and thereby shifts the latch output by the desired 35 nanoseconds.

Figure 16B:
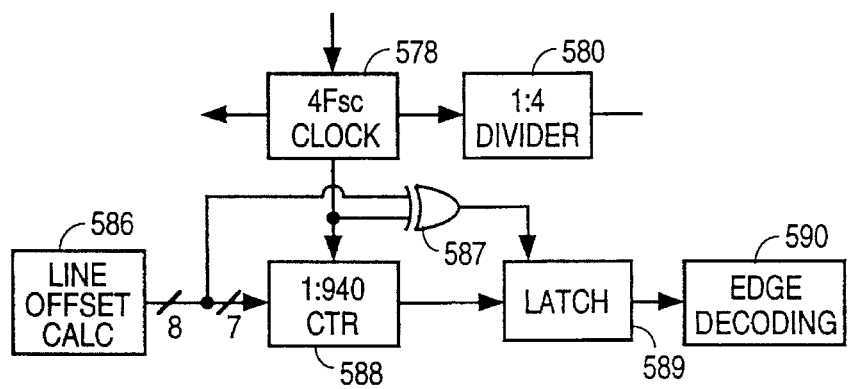
FIGS. 16A, 16B show block diagrams of descramblers using digital HBI synthesis and interpolation in accordance with the invention.
Figure 16A:
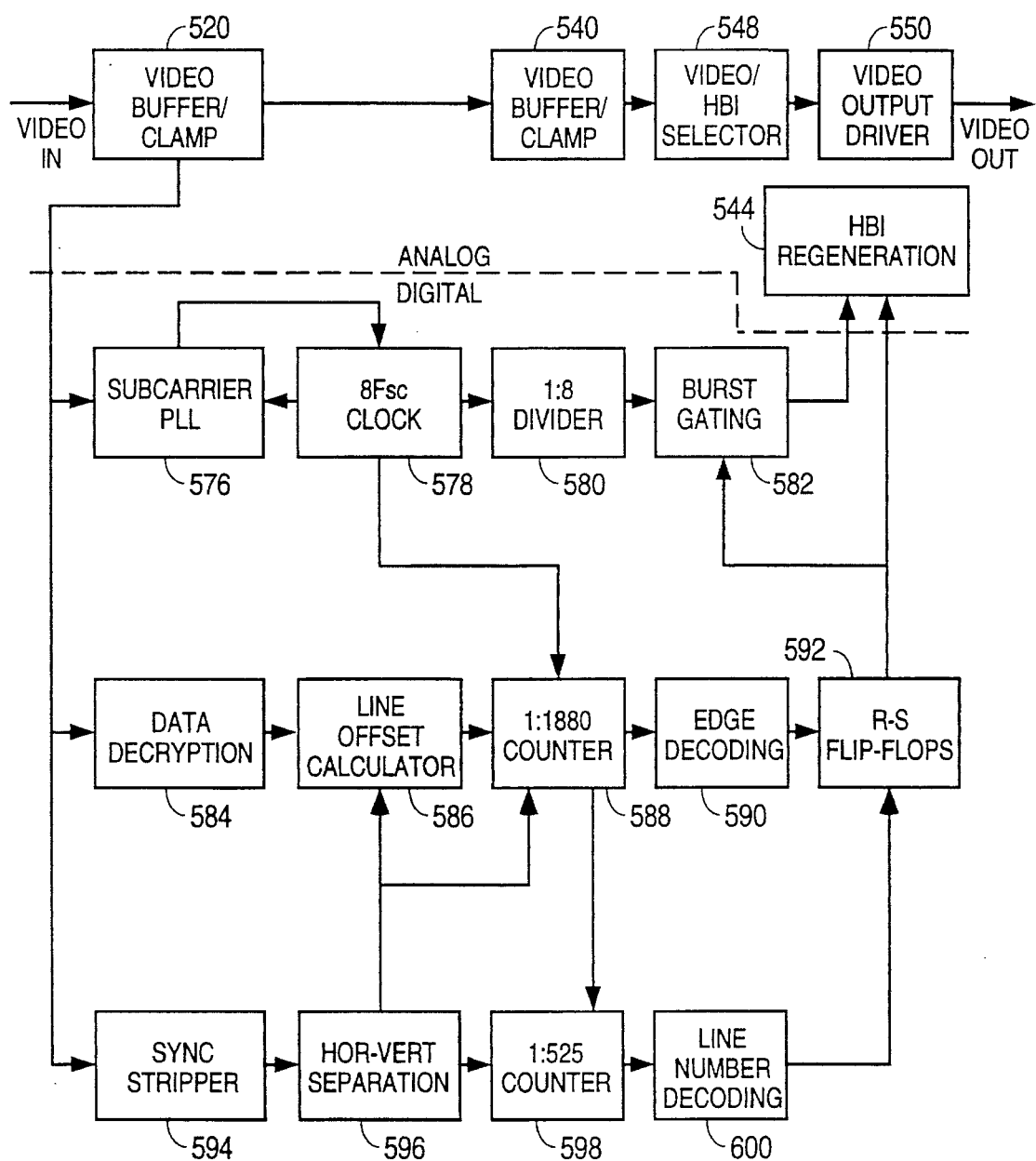

Referring to both FIGS. 16A and 16B, the 11-bit output of the counter 588 is conventionally decoded at edge decoder 590 to provide six timing edges corresponding to leading and trailing edges of the desired sync, blanking, and burst gate pulses; it will be seen that these edges are moving, as an ensemble, with the declared "wobble" due to the line-rate varying preset to the counter. The timing edges are conventionally applied to three R-S flipflops 592 to generate the actual pulses. In practice, additional "house-keeping" pulses can be similarly decoded and formed as required.

In the fourth row, the sync signal is separated at sync stripper 594 from the video and separated further into horizontal and vertical sync pulses at separation block 596. The horizontal sync is used to reset the 1880 counter 588; the vertical is used to reset a divide-by-525 counter 596, which is clocked by horizontal sync and used to count lines in the frame in line number decoding block 600 for various house-keeping purposes—in particular, to inhibit the HBI regeneration process in block 544 during the 22 lines of the vertical interval.

VERTICAL SYNC TIMESHIFT SCRAMBLING

The object of this embodiment is to cause the picture wobble in the vertical as well as horizontal. The implementation requires only that the present one-line memory (RAM) which drives the adder 78 and subtractor 80 on the RAM board be extended to something like twenty-one lines, with provision to select the output of any of the twenty-one lines randomly. In practice, then, compared with the video out of the eleventh of the twenty-one memory stages, video from the first is advanced by ten lines and video from the last is delayed by ten lines; twenty lines peak-to-peak out of 240 active lines per field compares directly to 4 microseconds horizontal motion out of 52 microseconds active picture width. A second randomly frequency modulated digital sine-line signal (analogous to the one which varies the read address for horizontal wobble) is used to select the output of different pairs of 1H buffer delays to be applied to the adder and subtractor for Y/C separation.

The number of 1H memory buffers can be varied for different applications and any suitable rate of variation can be used; in particular the rate of variation can be randomly controlled as with the horizontal scrambling of the FIG. 4 system, in which case a second byte of data would be added to the vertical interval to describe the vertical variation, analogous to the first byte used to describe the horizontal variation. The second byte would of course be encrypted like the first byte.

Figure 17:
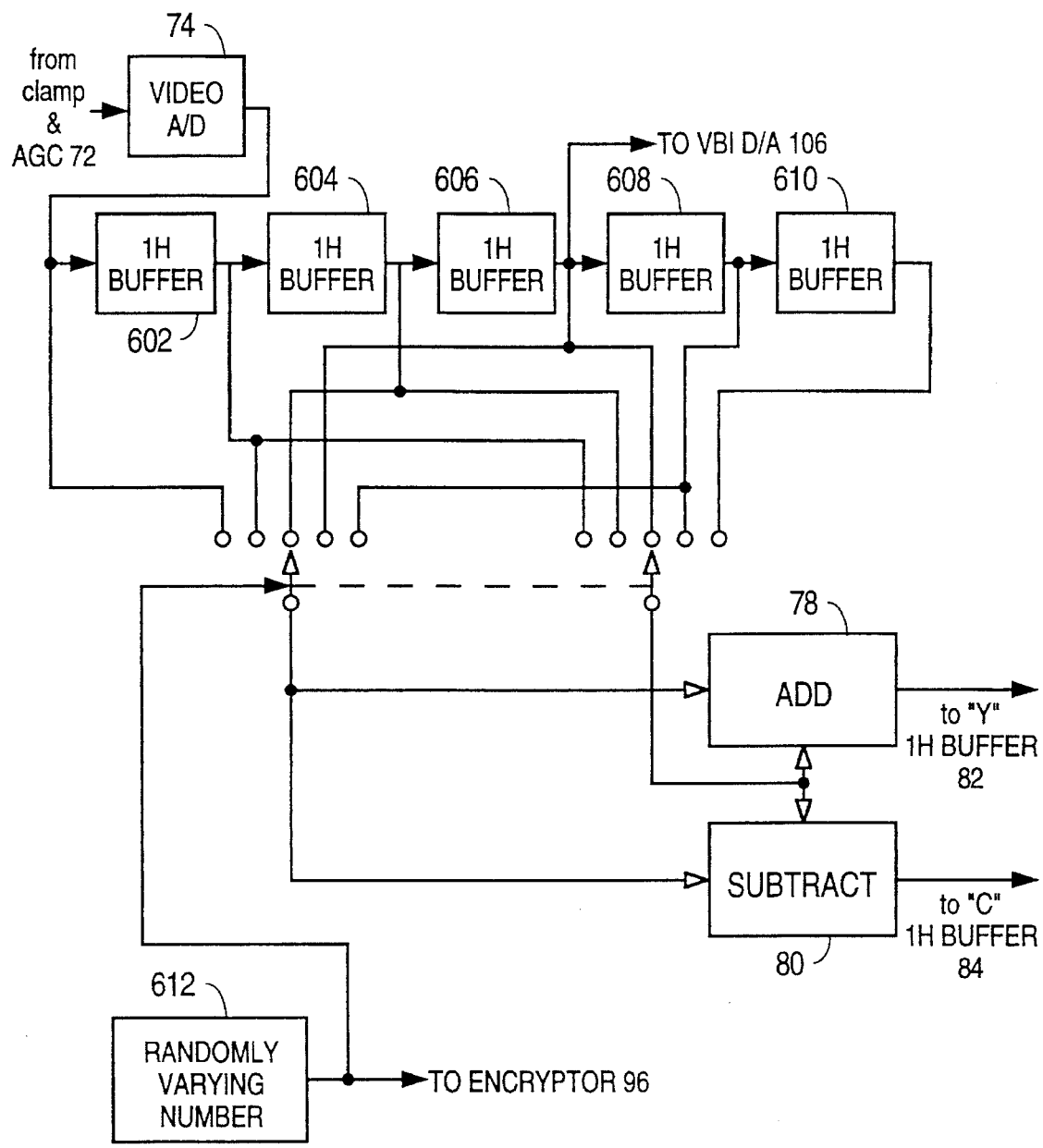
FIG. 17 shows a vertical wobble, i.e. scrambling function, in accordance with the invention.

FIG. 17, shows such a system with a 5-line variation and replaces in toto the block 76 labelled "1H BUFFER" of FIG. 4. FIG. 17 shows portions corresponding to the circuitry of FIG. 9 including video A/D 74, adder 78 and subtractor 80. Five 1H buffers 602, 604, 606, 608, 610 replace the single 1H buffer 76 of FIG. 4. The buffers 602, . . . , 610 are selected according to a randomly varying number generated by random number generator 612, which as described above generates a frequency modulated digital sine wave-like signal to select one of buffers 602, . . . , 610 for each video field thus randomly varying the amount of vertical timeshifting. In any case, for the selected buffer, the adder 78 and subtractor 80 are driven with the selected buffer's input and output, analogously to the circuit of FIG. 4. Thus at all times the adder 78 and subtractor 80 are presented with two video signals differing by exactly one line (1H) and thus the Y-C separation proceeds uninhibited.

Descrambling requires simply that the vertical sync signal be wobbled to match the picture, analogously to the above-described horizontal wobble; TV sets, monitors or projectors which use line-counting vertical deflection systems would be modified to accept a time-varying line-count, while the older multivibrator-based TV units would require no modification.

Edge-fill provisions similar to those described above are used to fill the top of the frame when the picture is shifted downward and the bottom of the frame when the picture is shifted upward; minor variations of the above described edge fill circuitry accomplish this.

The above description of the invention is illustrative and not limiting; further modifications will be apparent to one of ordinary skill in the art in the light of this disclosure and the appended claims.

We claim:

1. A method for restoring vertical detail in an NTSC television decoder where a video signal is separated into a luma signal and a chroma signal, comprising the steps of:

selecting the active video portions of the separated chroma signal;

filtering away high frequency parts and thereby the chroma portion of the selected active video portions; and combining the remaining portions of the chroma signal which consist of the desired vertical detail, with the luma signal.

2. The method of claim 1, further comprising adding the chroma portion of the chroma signal back to the combined signal to provide an output signal.

3. The method of claim 1, wherein the step of filtering removes those parts of the signal exceeding approximately 2 MHz.

4. A method for restoring vertical detail in an NTSC television decoder where a video signal is separated into a luma signal and a chroma signal, comprising the steps of:

selecting the active video portions of the separated chroma signal;

filtering away high frequency parts containing the chroma portion of the selected active video portions;

combining the remaining portions of the chroma signal which consist of desired vertical detail, with the luma signal; and further comprising adding the chroma signal back to the combined signal to provide an output signal;

wherein the step of filtering removes those parts of the separated chroma signal exceeding approximately 2 MHz.

\* \* \* \* \*